(12) United States Patent
Yin et al.

(10) Patent No.: US 10,397,939 B2
(45) Date of Patent: Aug. 27, 2019

(54) SYSTEMS AND METHODS FOR PHYSICAL UPLINK SHARED CHANNEL (PUSCH) FORMAT SIGNALING AND CONTENTION ACCESS

(71) Applicants: Sharp Kabushiki Kaisha, Sakai-ku, Sakai, Osaka (JP); FG Innovation Company Limited, New Territories, Hong Kong (CN)

(72) Inventors: Zhanping Yin, Vancouver, WA (US); Toshizo Nogami, Chiba (JP)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/015,288

(22) Filed: Jun. 22, 2018

(65) Prior Publication Data

US 2018/0302913 A1    Oct. 18, 2018

Related U.S. Application Data

(63) Continuation of application No. 15/590,830, filed on May 9, 2017, now abandoned.
(Continued)

(51) Int. Cl.
*H04W 72/12* (2009.01)
*H04W 16/14* (2009.01)
(Continued)

(52) U.S. Cl.
CPC ....... *H04W 72/1263* (2013.01); *H04W 16/14* (2013.01); *H04W 72/1268* (2013.01);
(Continued)

(58) Field of Classification Search
CPC ... H04L 1/1812; H04L 1/1896; H04L 5/0055; H04L 16/17; H04W 72/0413; H04W 16/14
See application file for complete search history.

(56) References Cited

U.S. PATENT DOCUMENTS

2015/0365931 A1    12/2015  Ng et al.
2016/0073344 A1    3/2016   Vutukuri et al.
(Continued)

FOREIGN PATENT DOCUMENTS

WO    2015116503 A1    8/2015
WO    2015131806 A1    9/2015
(Continued)

OTHER PUBLICATIONS

Huawei, HiSilicon, "Summary on (84-14) PUSCH frame structure in eLAA", 3GPP TSG RAN WG1 Meeting #84bis, Busan, Korea, R1-162728, Apr. 15, 2016.
(Continued)

*Primary Examiner* — Mewale A Ambaye
(74) *Attorney, Agent, or Firm* — Austin Rapp

(57) ABSTRACT

A user equipment (UE) for transmitting signals in a Licensed-Assisted Access (LAA) serving cell is described. The UE includes a processor and memory in electronic communication with the processor. The UE receives an uplink (UL) grant for one or more UL LAA subframes from one or more downlink control information (DCI). The UE also determines a UL LAA physical uplink shared channel (PUSCH) format or structure for a UL LAA subframe. The UE further determines whether listen before talk (LBT) is needed for a scheduled LAA PUSCH. If needed, the UE determines a UL contention access region based on the UL grant for a UL LAA subframe. The UE also determines a UL contention access method in the contention access region. The UE further performs UL contention access in the UL
(Continued)

contention access region. The UE additionally transmits the LAA PUSCH if channel access succeeds.

2 Claims, 15 Drawing Sheets

Related U.S. Application Data

(60) Provisional application No. 62/334,964, filed on May 11, 2016.

(51) Int. Cl.
*H04W 74/08* (2009.01)
*H04W 84/04* (2009.01)
*H04W 74/00* (2009.01)

(52) U.S. Cl.
CPC ... *H04W 72/1294* (2013.01); *H04W 74/0816* (2013.01); *H04W 84/042* (2013.01); *H04W 74/006* (2013.01)

(56) References Cited

U.S. PATENT DOCUMENTS

| 2017/0094681 | A1 | 3/2017 | Takeda et al. | |
| 2017/0118728 | A1* | 4/2017 | Harada | H04W 52/38 |
| 2017/0273109 | A1 | 9/2017 | Babaei et al. | |
| 2017/0302493 | A1* | 10/2017 | Yang | H04L 1/0029 |
| 2018/0077643 | A1* | 3/2018 | Dinan | H04W 52/0216 |

FOREIGN PATENT DOCUMENTS

| WO | 2015174437 A1 | 11/2015 |
| WO | 2015190844 | 12/2015 |

OTHER PUBLICATIONS

Qualcomm Incorporated, "Summary of email discussion on UL LBT and traffic multiplexing", 3GPP TSG RAN WG1 Meeting #84bis, Busan, Korea, R1-163021, Apr. 15, 2016.

LG Electronics, Qualcomm, Sharp, (Nokia), (Alcatel-Lucent Shanghai Bell), . . . , "WF on PUSCH multi-subframe scheduling in LAA", 3GPP TSG RAN WG1 Meeting #84bis, Busan, Korea, R1-163565, Apr. 15, 2016.

Huawei, Hisilicon, . . . , "WF on PUSCH transmissions in eLAA", 3GPP TSG RAN WG1 Meeting #84bis, Busan, Korea, R1-163584, Apr. 15, 2016.

Qualcomm, "Way Forward on further details of DCI contents for multi-TTI transmission", 3GPP TSG RAN WG1 Meeting #84bis, Busan, Korea, R1-163829, Apr. 15, 2016.

Mediatek, "Multi-TTI scheduling", 3GPP TSG RAN WG1 Meeting #84bis, Busan, Korea, R1-163830, Apr. 15, 2016.

Ericsson, "WF on UL Channel Access Schemes", 3GPP TSG RAN WG1 Meeting #84bis, Busan, Korea, R1-163632, Apr. 15, 2016.

Intel, Samsung, . . . , "Way forward on UL LBT", 3GPP TSG RAN WG1 Meeting #84bis, Busan, Korea, R1-163707, Apr. 15, 2016.

Ericsson, "WF on UL Channel Access Schemes", 3GPP TSG RAN WG1 Meeting #84bis, Busan, Korea, R1-163810, Apr. 15, 2016.

LG Electronics, CATT, WILUS, . . . "WF on PUSCH SRS structure in LAA", 3GPP TSG RAN WG1 Meeting #84bis, Busa, Korea, R1-163758, Apr. 15, 2016.

Samsung, "Discussion on LBT for self-carrier scheduling", 3GPP TSG RAN WG1 Meeting #84bis, Busan, Korea, R1-162671, Apr. 15, 2016.

Intel Corporation, "UL LBT details", 3GPP TSG RAN WG1 Meeting #84bis, Busan, Korea, R1-162359, Apr. 15, 2016.

Huawei, HiSilicon, "Discussion on CCA gap and symbol position for PUSCH and SRS for eLAA", 3GPP TSG RAN WG1 Meeting #84bis, Busan, Korea, R1-162131, Apr. 15, 2016.

Samsung, "Discussion on SRS for UL LAA", 3GPP TSG RAN WG1 Meeting #84bis, Busan, Korea, R1-162665, Apr. 15, 2016.

International Search Report and Written Opinion issued for PCT Application No. PCT/US2017/031982 dated Aug. 21, 2017.

Office Action issued for U.S. Appl. No. 15/590,830 dated Jan. 10, 2018.

* cited by examiner

SYSTEMS AND METHODS FOR PHYSICAL UPLINK SHARED CHANNEL (PUSCH) FORMAT SIGNALING AND CONTENTION ACCESS

RELATED APPLICATIONS

This application is a continuation of U.S. patent application Ser. No. 15/590,830 entitled "SYSTEMS AND METHODS FOR PHYSICAL UPLINK SHARED CHANNEL (PUSCH) FORMAT SIGNALING AND CONTENTION ACCESS," filed May 9, 2017, which is related to and claims priority from U.S. Provisional Patent Application No. 62/334,964, entitled "SYSTEMS AND METHODS FOR PHYSICAL UPLINK SHARED CHANNEL (PUSCH) FORMAT SIGNALING AND CONTENTION ACCESS," filed on May 11, 2016, which are all hereby incorporated by reference herein, in their entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
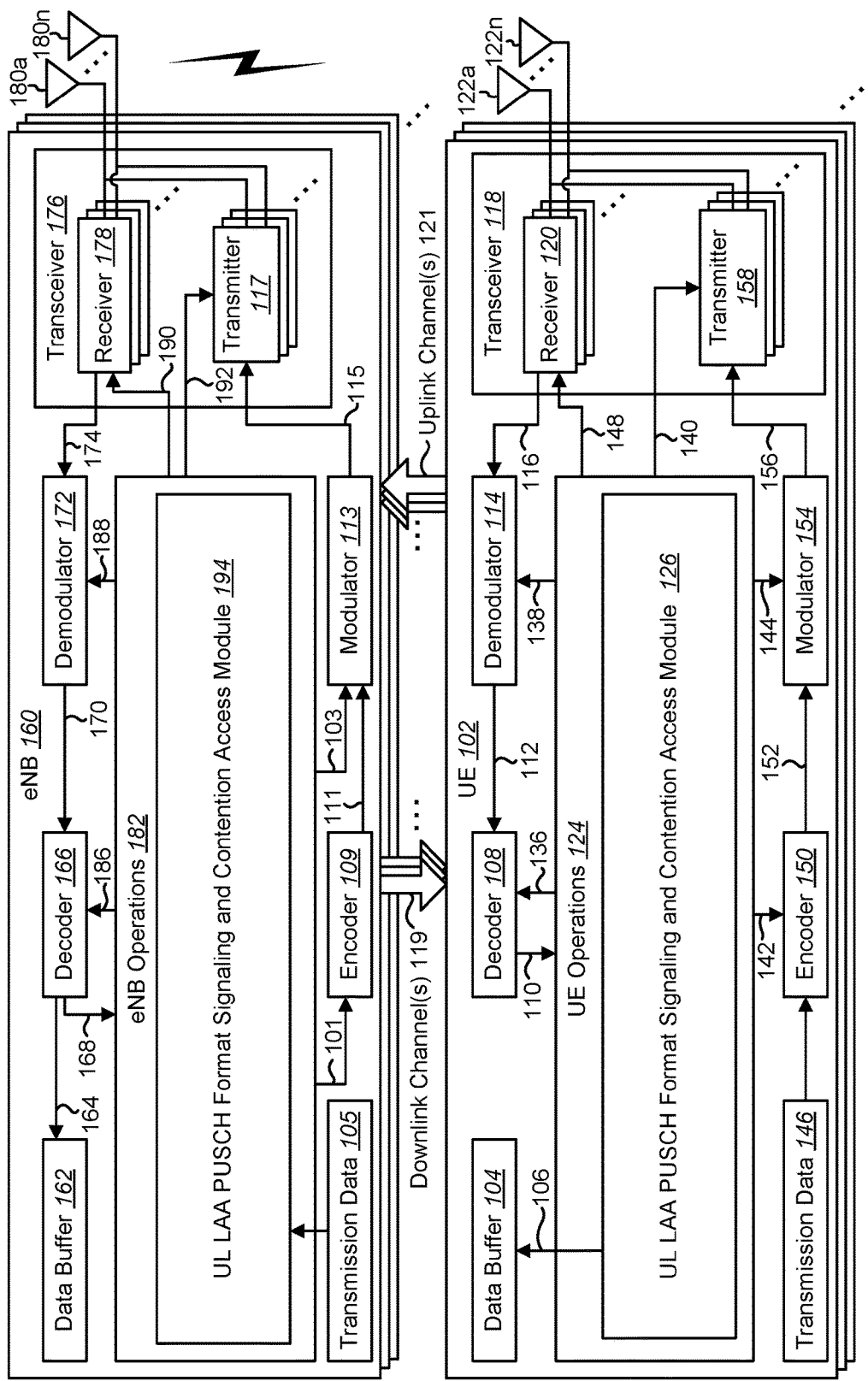
FIG. 1 is a block diagram illustrating one implementation of one or more evolved NodeBs (eNBs) and one or more user equipments (UEs) in which systems and methods for physical uplink shared channel (PUSCH) format signaling and contention access may be implemented.

A user equipment (UE) for transmitting signals in a Licensed-Assisted Access (LAA) serving cell is described. The UE includes a processor and memory in electronic communication with the processor. The UE receives an uplink (UL) grant for one or more UL LAA subframes from one or more downlink control information (DCI). The UE also determines a UL LAA physical uplink shared channel (PUSCH) format or structure for a UL LAA subframe. The UE further determines whether listen before talk (LBT) is needed for a scheduled LAA PUSCH. If needed, the UE determines a UL contention access region based on the UL grant for a UL LAA subframe. The UE also determines a UL contention access method in the contention access region. The UE further performs UL contention access in the UL contention access region. The UE additionally transmits the LAA PUSCH if channel access succeeds.

The UL grant DCI may indicate the LAA PUSCH format of the scheduled subframe and information about the availability of the last symbol of the previous subframe.

The UL LAA PUSCH format or structure for a UL LAA subframe may start from symbol 0 or 1 and may end at symbol 12 or symbol 13.

The UL LAA PUSCH may start at symbol 0 and the last symbol of the previous subframe may not be blank. When the previous LAA subframe transmission is successful, the UE may transmit the scheduled LAA PUSCH without LBT.

The contention access region may be determined based on the indicated LAA PUSCH structure. The contention access region may be determined based on the indicated LAA PUSCH structure and whether the last symbol of the previous subframe is blank.

A method for transmitting signals in an LAA serving cell is also described. The method includes receiving a UL grant for one or more UL LAA subframes from one or more DCI. The method also includes determining a UL LAA PUSCH format or structure for a UL LAA subframe. The method further includes determining whether LBT is needed for a scheduled LAA PUSCH. If needed, the method additionally includes determining a UL contention access region based on the UL grant for a UL LAA subframe. The method also includes determining a UL contention access method in the contention access region. The method further includes performing UL contention access in the UL contention access region. The method additionally includes transmitting the LAA PUSCH if channel access succeeds.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same time division duplex (TDD) uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

An LTE UL transmission may be scheduled by an eNB with an uplink grant. A UL grant may be a DCI format in a physical downlink control channel (PDCCH), an enhanced PDCCH (EPDCCH), or Physical Hybrid ARQ Indicator Channel (PHICH) feedback. The time between a UL grant and the scheduled UL transmission is at least 4 milliseconds (ms). The eNB may schedule multiple LAA subframe transmissions for a single LAA UE. The eNB may schedule simultaneous UL transmissions from multiple UEs in a single subframe.

For enhanced LAA uplink transmissions, the LAA PUSCH format can be indicated by dynamic signaling. The channel access methods (e.g., the LBT method), may be configured jointly with or independently from the PUSCH formats. However, there are some inherent relationship between the LBT method and PUSCH format. In some cases, the LBT method or PUSCH format cannot be performed as indicated; some special handlings may be needed.

This disclosure describes use cases of different LAA PUSCH formats and potential LBT methods that can be applied at each LAA PUSCH format. Furthermore, the mechanisms to apply the appropriate LBT and/or PUSCH structure under different conditions are described herein.

Some methods have been proposed for LAA uplink transmission for 3GPP. The candidates include single clear channel assessment (CCA) sensing (e.g., 25 microsecond (μs) initial CCA (ICCA) size sensing) before transmission; random backoff within a contention window size; random backoff with counter indicated by the eNB; and no LBT if the temporal gap between a DL and UL transmission is very small (e.g., less than 16 or 25 μs).

The LBT method may be indicated for a UL LAA transmission. For eLAA uplink LAA transmissions, different LBT methods may be signaled for different LAA subframes. In a multiple subframe scheduling, the same LBT method may be indicated for all subframes, or a different LBT method can be indicated for each subframe in a multiple subframe scheduling. Furthermore, the LBT method for each subframe may be determined implicitly by the indicated LAA PUSCH format.

However, to perform LBT, the LAA UE may need to know the PUSCH format of the scheduled subframe as well as the LAA PUSCH format of the previous subframe. For multiple subframe scheduling, the indicated PUSCH format may not be usable if the previous subframe LBT fails. Thus, some error handling and false back mode operation may be performed.

The systems and methods described herein provide for the following. The LAA PUSCH format of the current subframe and previous subframe may be indicated in the DCI format of the UL grant. The LBT method may be indicated by dynamic signaling, and the LBT parameters may be explicitly signaled or implicitly determined based on the CCA gap allocation. The LBT method may be determined based on the format and location of a scheduled LAA PUSCH. The LBT parameters may be modified in the case of a failed LBT process in earlier subframes.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for contention access may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UL LAA PUSCH format signaling and contention access module 126.

An enhanced licensed assisted access (eLAA) may be used for uplink LAA transmission. eLAA may support multiple LAA subframe scheduling. eLAA may have DCI format(s) to schedule PUSCH transmission in k<=N subframes with single TB per subframe or two TBs per subframe. The value(s) of N may be either semi-statically configured or hard-coded.

DCI format(s) may have the following scheduling information types. Type A may be common to all the scheduled subframes (appearing only once in a DCI). Type A may include a carrier indicator, resource assignment, cyclic shift for DM RS and OCC index. Type B may include subframe-specific information (appearing N times for N subframes scheduling).

For a LAA PUSCH format, the start and ending symbol may be dynamically signaled. One symbol in a subframe containing PUSCH may be blanked.

Dynamic signaling may indicate whether PUSCH in a UL subframe is transmitted from start of DFT-S-OFDM symbol 0 or the start of DFT-S-OFDM symbol 1. Dynamic signaling may indicate whether PUSCH in a UL subframe is transmitted up to OFDM symbol 13 or OFDM symbol 12. Any combination of the above options can be enabled by the dynamic signaling.

For channel access listen before talk (LBT) method, a single 25 µs LBT within a maximum channel occupancy time (MCOT) may be used as follows. If the sum total duration of DL and UL transmissions (and UL LBT) is less than the obtained channel occupancy duration, it is sufficient for the UE(s) 102 to perform a single 25 µs LBT to access the channel and perform UL transmission.

Licensed-Assisted Access (LAA) supports LTE in unlicensed spectrum. In a LAA network, the LAA subframe transmission occurs in an opportunistic manner. Thus, listen before talk (LBT) with clear channel assessment (CCA) is required before a LAA transmission. The DL-only LAA was specified in LTE release-13.

An LTE UL transmission may be scheduled by an eNB 160 with an uplink grant. A UL grant may be a DCI format in a PDCCH, EPDCCH, or PHICH feedback. The time between a UL grant and the scheduled UL transmission may be at least 4 ms. The eNB 160 may schedule simultaneous UL transmissions from multiple UEs 102 in a single subframe. For a scheduled UL transmission, the eNB 160 should make sure there is no conflict between a DL and a UL on the same LAA cell.

The LAA PUSCH subframe may have one or two blank symbols. The blanked symbol space may be used for channel access. This space may be called a contention access region or a CCA gap. For a LAA DL transmission, the contention access or LBT may be performed at any subframe and symbol location. On the other hand, the UL LAA is a transmission scheduled by UL grant with a given timing. With UL LAA, the LBT and contention access may only be performed in a contention access region.

There are several approaches that may be implemented for UL LBT. The pros and cons of these approaches are described below. In a first approach, no LBT is performed if the temporal gap between a DL and UL is very small. In this approach, a UL transmission may happen without LBT if the gap between a DL and a UL is very small. However, this approach has many restrictions. First, the LAA DL transmission cannot avoid the hidden terminal issue, as described in connection with FIG. 3.

In a second restriction, the start time of the UL LAA should be known in advance or may be fixed. The ending time of a DL transmission should be known in advance. Furthermore, this approach only works for the first UL transmission after a DL LAA transmission, and cannot be used for other LAA UL transmissions. Additionally, the LAA DL burst should be last at least 4 ms in order to keep the association timing between the DL scheduling DCI and UL transmission. It is very difficult support variable length LAA transmissions and consecutive UL LAA transmissions. Therefore, although it is feasible in some cases for a LAA UL transmission without LBT when the gap is very small, this approach brings many restrictions and may be hard to justify.

However, in the case where there is no other present unlicensed network (e.g. WiFi or LAA cells from other operators), this approach may be applicable. Especially, if LAA patterns include LAA DL and LAA UL subframes are defined, this approach can be used.

In a second approach, a category 2 LBT may be performed before a scheduled transmission. Category 2 LBT only requires a single CCA sensing before transmission. This is also called frame based equipment (FBE) contention access. Category 2 LBT may make sense because a UL transmission is scheduled, and the UL transmission should be dropped if it cannot get the channel at scheduled time. Furthermore, this approach allows simultaneous UL transmission from multiple UEs 102 since they all sense the same CCA interval before transmission. An example of a category 2 UL LAA transmission is described in connection with FIG. 4.

To avoid potential interruption of WiFi transmission, the CCA sensing interval should have a length of a minimum defer duration ($T_d$), which includes duration $T_f$=16 us immediately followed by a slot duration of $T_{sl}$=9 us, and $T_f$ includes an idle slot duration $T_{sl}$ at the start of $T_f$. A slot duration $T_{sl}$ is considered to be idle if the eNB 160 senses the channel during the slot duration, and the power detected by the eNB 160 for at least 4 us within the slot duration is less than an energy detection threshold $X_{Thresh}$. Otherwise, the slot duration $T_{sl}$ is considered to be busy.

However, since the single CCA sensing is located at a fixed location in a subframe structure, it reduces the channel access probability and the chance to use another region for channel access. Therefore, although a category 2 LBT before scheduled transmission is possible, it is too restrictive on the LBT sensing and LAA transmission timing.

Similarly, in the case where there is no other present unlicensed network (e.g., WiFi or LAA cells from other operators), this approach may be used. If no other unlicensed network is present, the LAA eNB 160 scheduler should ensure there is no conflict between a LAA DL transmission and a LAA UL transmission. In this case, a single CCA detection before UL transmission should be sufficient.

The category 2 LBT is also known as a single CCA sensing of at least 25 micro-seconds (µs) before transmission. However, it is not clear when a UE 102 can start a UL LAA transmission in a contention access region or CCA gap. Thus, a single CCA sensing of at least 25 µs before transmission may be performed at different locations of a CCA gap with inherent impact on the LAA UL signal transmission. Different approaches for the single CCA sensing timing are described.

Figure 4:
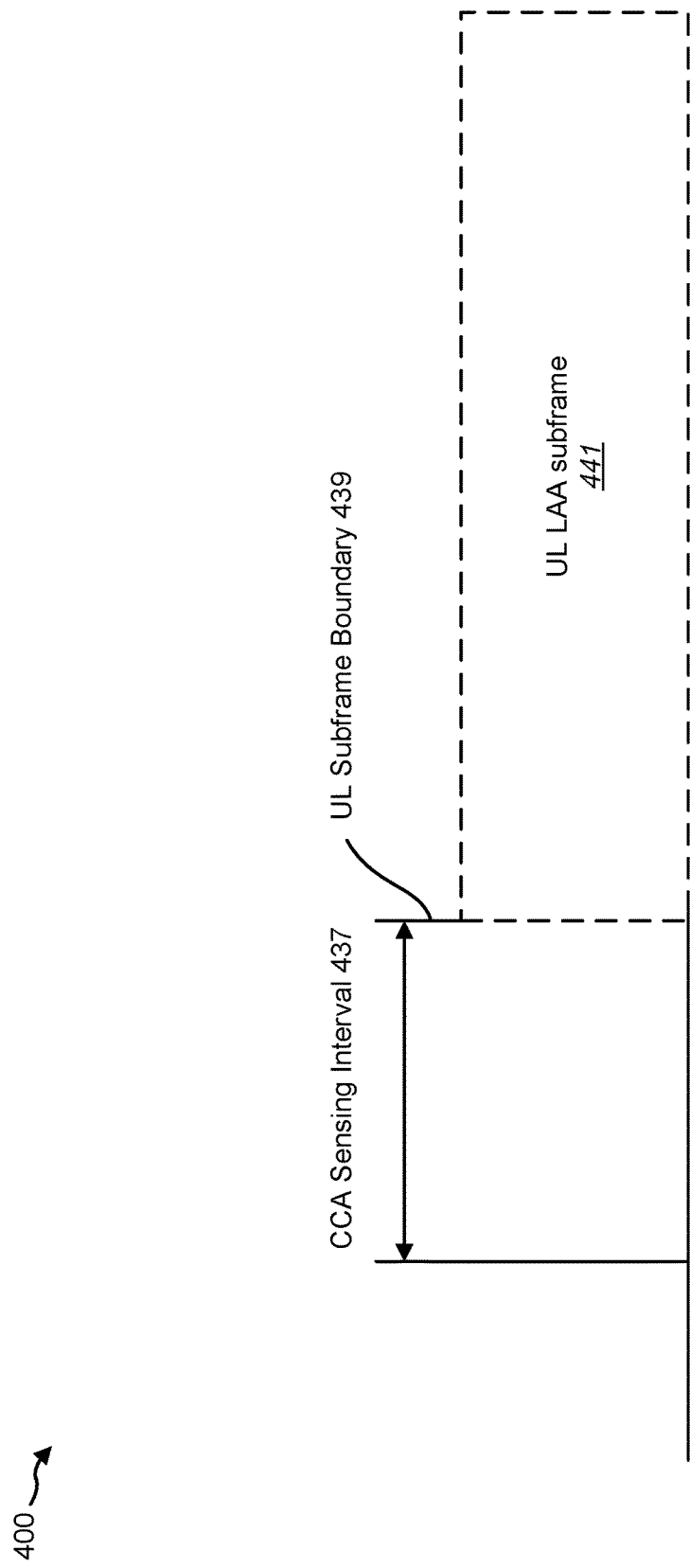
FIG. 4 is a diagram illustrating a category 2 UL Licensed-Assisted Access (LAA) transmission.

In one approach, the single CCA sensing of at least 25 µs may be performed at the end of a CCA gap (i.e., immediately before a scheduled UL LAA transmission with an indicated UL LAA PUSCH format). This provides the latest channel access opportunity within a CCA gap. For the CCA sensing interval, the UL timing advance may be considered. Thus, the sensing interval may be based on UL timing with the TA value adjusted, as shown in FIG. 4.

However, any unlicensed transmission that happens before and within the CCA sensing slot may block the UL LAA transmission. Thus, the UL LAA tends to have the lowest priority in channel access with this approach. Because the CCA sensing is performed immediately before a schedule UL subframe with an indicated PUSCH format, there is no need to add an extra reservation signal or an initial signal before the UL LAA subframe in a UL LAA transmission.

Figure 5:
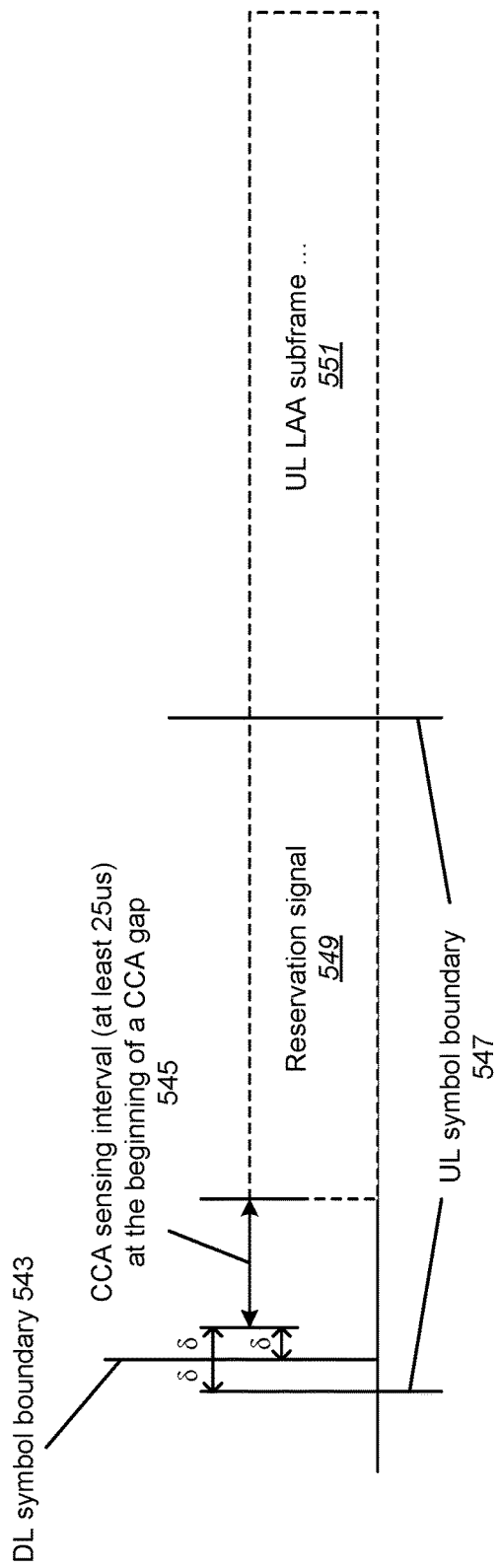
FIG. 5 illustrates an example a single clear channel assessment (CCA) sensing of at least 25 microseconds (μs) at the beginning of a CCA gap.

In another approach, the single CCA sensing of at least 25 µs may be performed at the beginning of a given CCA gap. In this approach, the single CCA sensing of at least 25 µs may be performed at the beginning of a CCA gap. This provides the earliest channel access opportunity within a CCA gap. For the sensing slot, the UL timing advance (TA) may be considered. Thus, the sensing slot may be based on DL timing (i.e., considering the propagation delay of a DL transmission). For UL timing, the TA value may be added to avoid collision with DL transmission of a previous subframe. FIG. 5 illustrates an example of this approach.

If there is another unlicensed transmission within the CCA sensing interval, the LBT fails, and the LAA UE 102 should defer the contention access in the next available CCA gap. If the CCA sensing is successful, a UL LAA UE 102 may start transmission. But a reservation signal or initial signal has to be transmitted before the scheduled UL PUSCH subframe to occupy the channel.

In yet another approach, the CCA sensing of at least 25 µs before a UL transmission may be performed continuously in a given CCA gap. Thus, the LBT may obtain the channel immediately after the channel becomes idle for a continuous 25 µs. This is a more aggressive approach and provides a maximum likelihood of UL LAA transmission. Once there is a 25 µs idle interval in the CCA gap, the UE 102 may transmit the UL LAA subframe. Similar to CCA sensing at the beginning of a CCA gap, a reservation signal or initial signal may have to be transmitted before the scheduled UL PUSCH subframe to occupy the channel.

Although there are different interpretations of CCA sensing of at least 25 µs before UL transmission, the specification may only specify one approach (e.g., at least 25 µs before the UL transmission at the OFDM symbol boundary). On the other hand, if multiple approaches are specified, the exact approach should be indicated in a UL scheduling DCI for a given subframe.

In a third approach, category 4 LBT may be performed. There are many possible LBT methods for category 4 depending on how to determine the contention window size, how to perform counter handling, etc. The contention window size may be signed by eNB 160. The contention window size may be adjusted based on feedback information, such as HARQ-ACK.

In one approach, the backoff counter may be suspended if the channel is sensed as occupied or within a defer period after an occupied channel. Thus, the backoff counter may not be able to reach 0 in a given CCA gap. In one method, the UL LAA LBT can be performed with continuous backoff counter handling as in DL LAA. The backoff counter may be extended to the next CCA gap if it is not successful. In another method, the backoff counter and LBT process may be reset if it there is not success in a CCA gap, and a new LBT and backoff counter should be initiated in a new CCA gap.

In another approach, the backoff counter may keep decreasing regardless of the channel condition. A LAA UE 102 may transmit if the channel is idle when the counter reaches 0. Thus, the backoff counter decides the sensing location in a CCA gap. If the backoff counter is determined based on the length of a CCA gap, it ensures the LBT process can be completed in a CCA gap.

Although there are different interpretations of category 4 LBT, the specification may only specify one method. However, several different category 4 methods may be defined. Furthermore, for a given LBT category 4 method, different LBT parameters may be used. Thus, the LBT category 4 method and/or LBT parameters may be indicated in a UL scheduling DCI for a given subframe. The LBT parameters may include the contention window size, a backoff counter value, the backoff counter handling methods, etc.

The systems and methods herein provide for the conditions of what LBT method and parameters should be applied under different LAA PUSCH format and channel access conditions. In an example of a possible UL LBT method and the corresponding CCA slot structure, the eNB 160 may indicate a channel access scheme (e.g., whether the above-described category 2 (also referred to as type-1 hereafter) channel access procedure or the above-described category 4 (also referred to as type-2 hereafter) channel access procedure).

For a type-1 channel access procedure, if a UE 102 is indicated to perform type-1 channel access procedure for a given subframe, the UE 102 may transmit a transmission including PUSCH in the subframe on a carrier on which LAA Scell(s) transmission(s) are performed, after first sensing the carrier to be idle during the slot durations of a defer duration $T_d$, which start at the initial subframe boundary of the subframe and after the counter N is zero in step 5 (below). The counter N may be adjusted by sensing the channel for additional slot duration(s) according to the steps below:

Step 1) set $N=N_{init}$, where $N_{init}=N_{stored}$ if $N_{stored}$ is stored, otherwise $N_{init}$ is a random number uniformly distributed between 0 and $CW_p$, and go to step 5.

Step 2) if the slot duration exceeds the first Single-carrier Frequency Division Multiple Access (SC-FDMA) symbol duration of the subframe, stop and set $N_{stored}$ to N, else go to 3.

Step 3) if N>0 and the UE 102 chooses to decrement the counter, set N=N−1.

Step 4) sense the channel for an additional slot duration, and if the additional slot duration is idle, go to step 5; else, go to step 6.

Step 5) if N=0, stop and flush $N_{stored}$; else, go to step 2.

Step 6) sense the channel during the slot durations of an additional defer duration $T_d$.

Step 7) if the channel is sensed to be idle during the slot durations of the additional defer duration $T_d$, go to step 2; else, go to step 6.

If a UE 102 has not transmitted a transmission including PUSCH in the subframe on a carrier on which LAA Scell(s) transmission(s) are performed after step 5 in the procedure above, the UE 102 may drop the PUSCH transmission in the subframe on the carrier.

The defer duration $T_d$ includes duration 16 us≤$T_f$≤16 us+$T_s$ immediately followed by $m_p$ consecutive slot durations where each slot duration is 9 us≤$T_{sl}$≤9 us+$T_s$, and $T_f$ includes an idle slot duration $T_{sl}$ at the start of $T_f$. Table 1 provides a channel access priority class.

TABLE 1

| Channel Access Priority Class (p) | $m_p$ | $CW_{min,p}$ | $CW_{max,p}$ | $T_{m\ cot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For a type-2 channel access procedure, if a UE 102 is indicated to perform type-2 channel access procedure for a given subframe, the UE 102 may transmit a transmission including PUSCH in the subframe on a carrier on which LAA Scell(s) transmission(s) are performed immediately after sensing the carrier to be idle for at least a sensing interval $T_{drs}$=25 us which starts at the initial subframe boundary of the subframe. $T_{drs}$ includes a duration $T_f$=16 us immediately followed by one slot duration $T_{sl}$=9 us and $T_f$ includes an idle slot duration $T_{sl}$ at the start of $T_f$. The carrier is considered to be idle for $T_{drs}$ if it is sensed to be idle during the slot durations of $T_{drs}$.

If a UE 102 is triggered with an SRS transmission without PUSCH for a given subframe, the UE 102 may transmit a transmission including SRS without PUSCH in the subframe on a carrier on which LAA Scell(s) transmission(s) are performed immediately after sensing the carrier to be idle for at least a sensing interval $T_{drs}$=25 us which ends right before the last SC-FDMA symbol of the subframe.

The type-2 channel access procedure may be equivalent to the type-1 channel access procedure with $m_p$=1 and N=0. Therefore, the UE 102 may have more channel access opportunities with the type-2 channel access procedure compared to the type-1 channel access procedure. On the other hand, with the type-2 channel access procedure, the start timing of the transmission including PUSCH may be able to be aligned among multiple UEs 102, and thus the type-2 channel access procedure may achieve UE multiplexing.

It should be noted that the eNB 160 may indicate the type-2 channel access procedure only for the PUSCH subframe that does not exceed MCOT following the eNB's DL transmission or for the PUSCH carrying UCI only. In addition, even if the UE 102 receives an UL grant indicating a type-1 channel access procedure for a given subframe, the UE 102 can perform a type-2 channel access procedure for the subframe if the eNB 160 indicates, after the UL grant reception, the use of type-2 channel access procedure for the subframe.

LAA PUSCH formats and LBT methods are also described herein. An LAA PUSCH may start from Discrete Fourier Transformation-Spread-Orthogonal Frequency Division Multiplexing (DFT-S-OFDM) symbol 0 or 1. An LAA PUSCH may end at symbol 12 or 13. Any combination of above options can be enabled by dynamic signaling. The LAA PUSCH format of a UL LAA subframe may be indicated in the corresponding UL grant. For multiple subframe scheduling, the same PUSCH format may be signaled for all subframes, or the PUSCH format of each subframe may be configured independently.

Similarly, the channel access method (i.e., the LBT method) may also be indicated in a UL grant DCI. The LBT method may be configured jointly with or independently from the PUSCH formats. However, there are some inherent relationships between the LBT method and PUSCH format. In some cases, the LBT method or PUSCH format cannot be performed as indicated. In these cases, some special handlings may be needed.

The use cases of different LAA PUSCH formats are summarized in the following description. Also, potential LBT methods that can be applied at each LAA PUSCH format are described. Furthermore, the mechanisms to apply the appropriate LBT and/or PUSCH structure under different conditions are discussed.

The LBT method may be indicated for a UL LAA transmission. For eLAA uplink LAA transmissions, different LBT methods may be signaled for different LAA subframes. In a multiple subframe scheduling, the same LBT method may be indicated for all subframes, or a different LBT method can be indicated for each subframe in a multiple subframe scheduling. Furthermore, the LBT method for each subframe may be determined implicitly by the indicated LAA PUSCH format.

There may be 4 possible LAA PUSCH formats. In a first format (Format 1), an LAA PUSCH may start at DFT-S-OFDM symbol 0 and transmit up to DFT-S-OFDM symbol 13 (No blank symbol in the LAA subframe). In a second format (Format 2), an LAA PUSCH may start at DFT-S-OFDM symbol 0 and transmit up to DFT-S-OFDM symbol 12 (the last symbol (symbol 13) is blank in the LAA subframe). Both format 1 and format 2 do not have a blank symbol at the beginning of the subframe. These two formats may be used for a single UL LAA subframe, or the initial UL LAA subframe in a burst of UL LAA subframes, or a continuous LAA UL subframe within a LAA UL burst. The cases with these formats are further discussed below.

In a first case (Case 1), LBT needs to be performed. In this case, the scheduled UL LAA subframe may be a single UL LAA subframe, or the initial UL LAA subframe in a burst of UL LAA subframes, or a subframe in the middle of a UL LAA burst where the previous subframe is indicated with the last symbol (symbol 13) blanked. This may be useful for simultaneous UL LAA transmissions from multiple LAA UEs 102.

Figure 6:
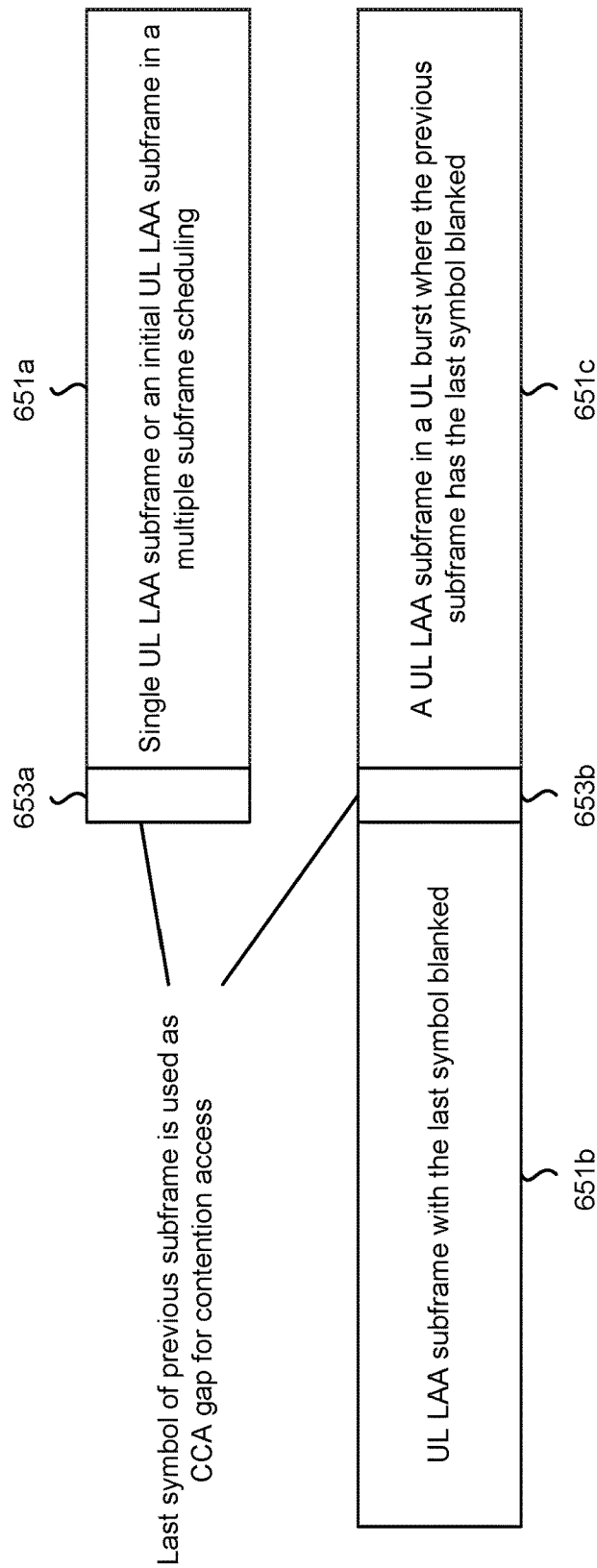
FIG. 6 is a diagram illustrating implementations of an LAA PUSCH with required listen before talk (LBT) channel access and no blank symbol.

In all these cases, LBT has to be performed, as shown in FIG. 6. The LBT process should be performed in the last symbol (symbol 13) space of the previous subframe (i.e., the UE 102 assumes that the last symbol (symbol 13) of the previous subframe can be used for channel access). The eNB 160 should make sure the last symbol (symbol 13) of the previous subframe of the scheduled UL LAA subframe is not occupied. The previous subframe may be a partial DL subframe, or a UL LAA subframe with the last symbol (symbol 13) punctured for the same or different UEs 102.

In one implementation, the UL grant may not indicate the LBT method for the given UL LAA subframe. The LBT method may be determined based on whether it is within the MCOT of an eNB 160 transmission. If the scheduled UL LAA subframe is within the MCOT of an eNB 160 transmission, a single CCA sensing of at least 25 μs may be applied before the UL LAA subframe transmission. If the scheduled UL LAA subframe is outside of the MCOT of an eNB 160 transmission, a category 4 LBT may be applied before the UL LAA subframe transmission.

In another implementation, the UL grant may indicate the LBT method for the given UL LAA subframe. The LAA UE 102 should follow the indicated LBT method for channel access. That is, if a single CCA sensing of at least 25 μs before transmission is indicated, the single CCA sensing should be applied regardless whether the UL LAA transmission is within or outside a MCOT of an eNB 160 transmission. Similarly, if a category 4 LBT is indicated, the category 4 LBT should be applied regardless whether the UL LAA transmission is within or outside a MCOT of an eNB 160 transmission. In the case when multiple LAA UE 102 transmissions are scheduled, the same LBT method and/or parameters should be signaled to participating LAA UEs 102.

In another approach, even if a category 4 LBT is indicated, if the scheduled UL LAA subframe is within the MCOT of an eNB 160 transmission, a single CCA sensing of at least 25 μs may be applied before the UL LAA subframe transmission. If the scheduled UL LAA subframe is outside of the MCOT of an eNB 160 transmission, a category 4 LBT may be applied before the UL LAA subframe transmission.

If the eNB 160 schedules multiple LAA UL transmissions from multiple UEs 102, the same LBT method and the LBT parameters, such as contention window size and backoff counter values etc., should be signaled to all participating UEs 102.

In a second case (Case 2), LBT may or may not be needed. If the scheduled UL LAA subframe is a continuous transmission within a LAA UL burst and the previous UL LAA subframe does not have the last symbol (symbol 13) blanked, whether an LBT is required or not depends on whether the previous LAA transmission is successful or not. Since the subframe is in the middle of a continuous LAA burst transmission, the LBT method may or may not be indicated.

Figure 7:
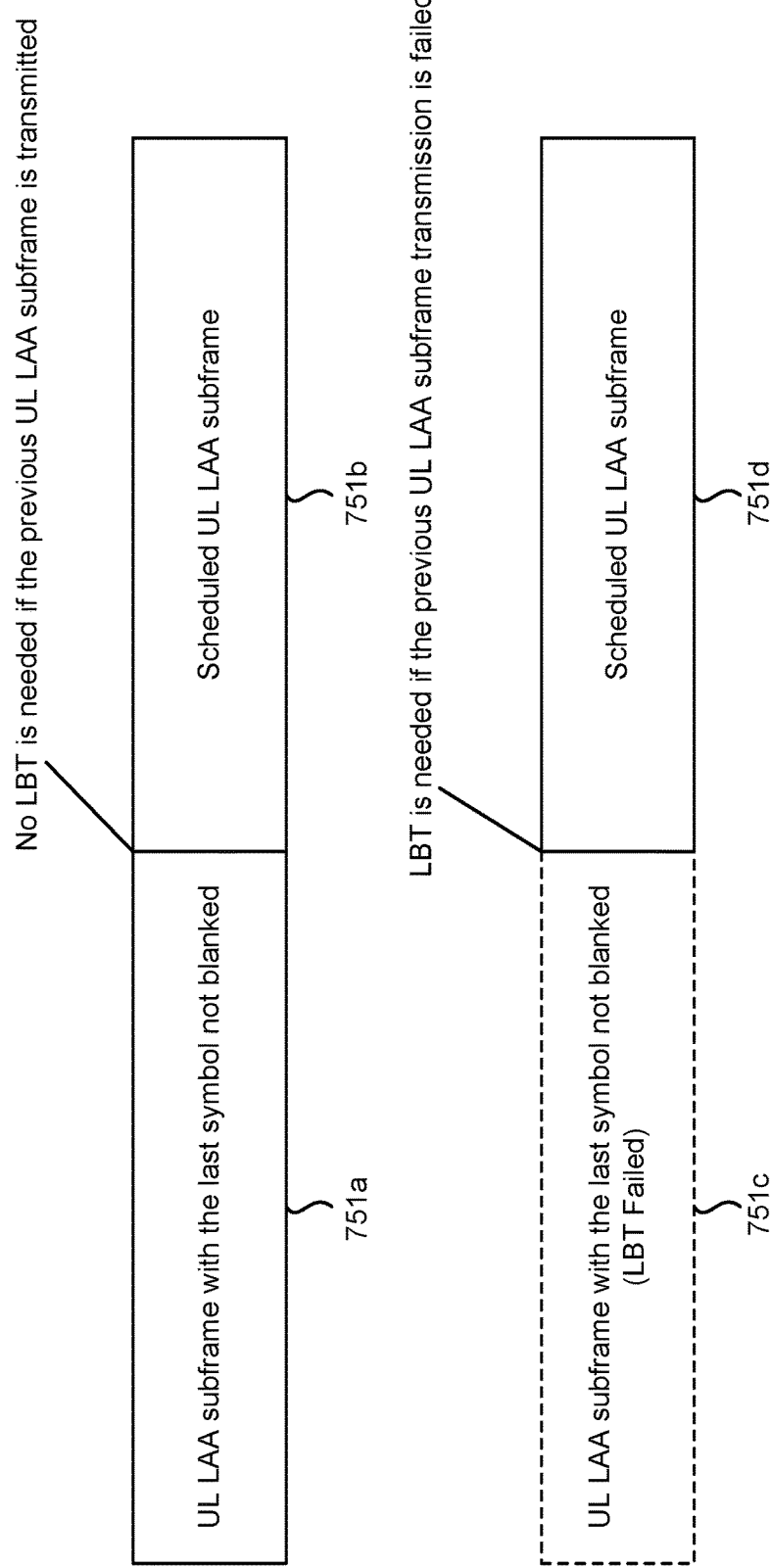
FIG. 7 is a diagram illustrating determining whether LBT is needed by the status of a previous UL LAA subframe transmission.

If the LBT method is indicated, as a continuous LAA transmission, LBT may not be needed if the previous UL LAA subframe is transmitted, as shown in FIG. 7. If no LBT method is indicated, LBT may still be performed if the previous LAA subframe is not transmitted due to a failed LBT in an earlier time.

Thus, if the LBT method is not indicated in a UL grant, the UE 102 behavior may be specified when the previous UL LAA subframe transmission fails. If the LBT method is indicated, it may be used in case of fallback operation when the previous LAA UL transmission fails. However, the detailed UE 102 behavior should be clarified (e.g., what LBT method should be used and where the CCA gap is assumed for LBT channel access).

Figure 8:
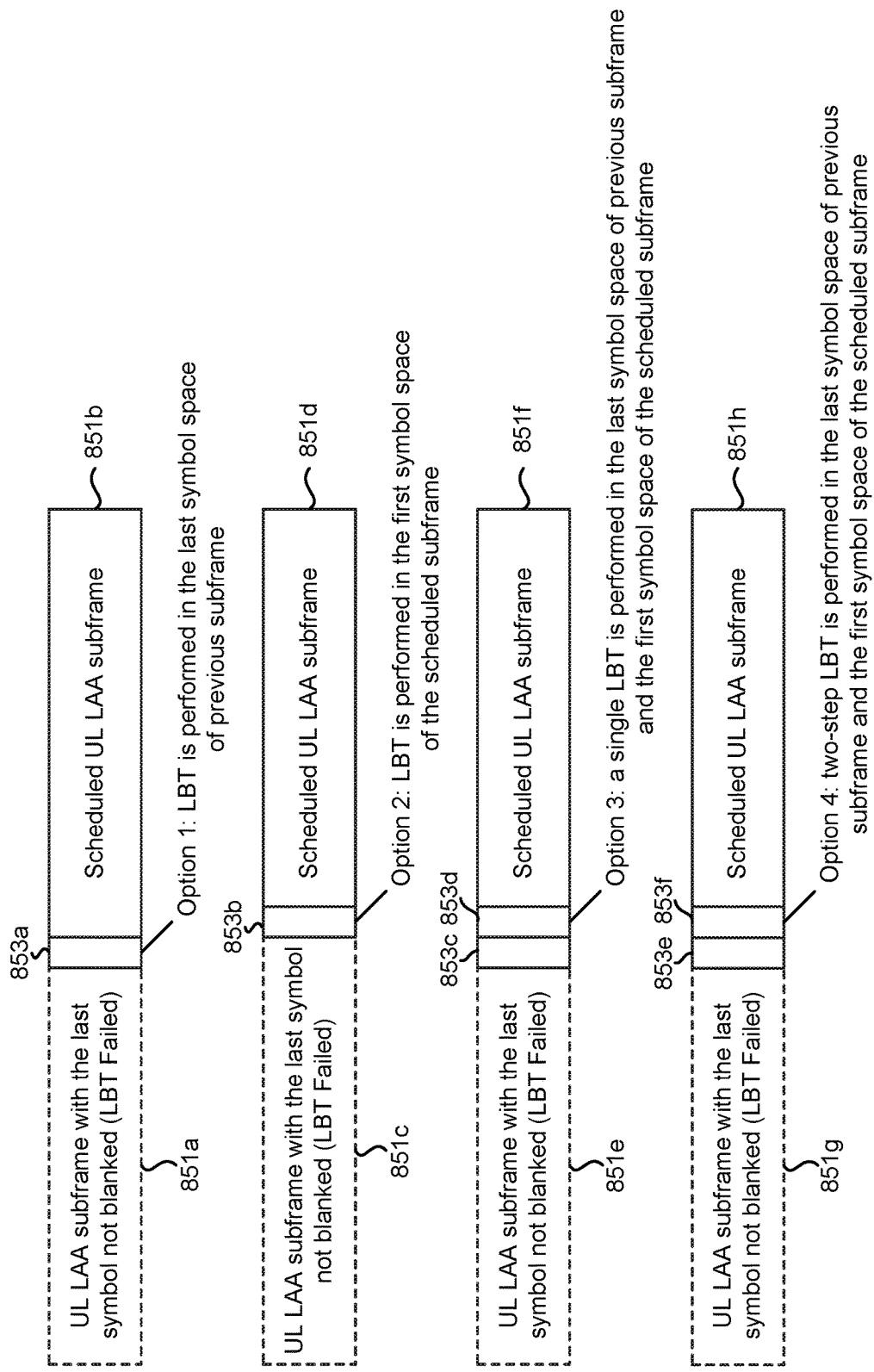
FIG. 8 is a diagram illustrating options for a CCA gap and LBT in the case of a failed transmission in a previous subframe.

Regardless of the LBT method, there are several different options to determine the CCA gap for contention access, as described below and as shown in FIG. 8. In a first option (Option 1), the LBT is performed in the last symbol (symbol 13) space of the previous subframe. The UE 102 may assume the last symbol (symbol 13) space of the previous subframe is used for channel access and performs LBT. The simplest method may be a single CCA sensing of at least 25 μs immediately before the scheduled transmission subframe boundary.

In a more complicated method, if the LBT method is indicated in the UL grant for the given UL LAA subframe, the given LBT method may be used. The LBT category 4 parameters may be based on a CCA gap of one symbol space. If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 μs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters should be based on a CCA gap of one symbol space.

In a second option (Option 2), the LBT is performed in the first symbol (symbol 0) space of the scheduled subframe. Since the previous LAA subframe LBT failed, the UE 102 may puncture the first symbol (symbol 0) space of the scheduled subframe for channel access and LBT. This provides a self-contained contention access region that is independent of previous subframe structure and transmissions. With option 2, the scheduled UL LAA subframe structure has to be modified by puncturing the first symbol (symbol 0).

The simplest method may be a single CCA sensing of at least 25 μs immediately before the scheduled transmission subframe symbol 1 boundary. In a more complicated method, if the LBT method is indicated in the UL grant for the given UL LAA subframe, the given LBT method may be used. The LBT category 4 parameters may be based on a CCA gap of one symbol space. If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 μs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters may be based on a CCA gap of one symbol space.

In a third option (Option 3), the LBT is performed in the last symbol (symbol 13) space of the previous subframe and the first symbol (symbol 0) space of the scheduled subframe. Since the previous LAA subframe LBT failed, the UE 102 may adjust the LBT and may assume that a larger CCA gap should be used. Thus, the UE 102 may use the space of the last symbol (symbol 13) of the previous subframe and puncture the first symbol (symbol 0) space of the scheduled subframe for channel access and LBT. With option 3, the scheduled UL LAA subframe structure has to be modified by puncturing the first symbol (symbol 0).

If the LBT method is indicated in the UL grant for the given UL LAA subframe, the given LBT method may be used. The LBT category 4 parameters may be based on a CCA gap of two symbol spaces. If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 μs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters may be based on a CCA gap of two symbol space.

In a fourth option (Option 4), a two-step LBT may be performed in the last symbol (symbol 13) space of the previous subframe and the first symbol (symbol 0) space of the scheduled subframe. Since the previous LAA subframe LBT failed, the UE 102 may adjust the LBT and assume a larger CCA gap should be used. Thus, the UE 102 may use the space of last symbol (symbol 13) of the previous subframe and puncture the first symbol (symbol 0) space of the scheduled subframe for channel access and LBT. However, to reduce the impact of PUSCH format change, the LBT may be performed in two steps.

First, an LBT may be performed in the space of the last symbol (symbol 13) of the previous subframe. If successful, the scheduled LAA UL subframe can be transmitted with the indicated LAA PUSCH format. If the LBT in the space of the last symbol (symbol 13) of the previous subframe fails, a second LBT may be performed in the space of the first symbol (symbol 0) of the scheduled subframe. If the second LBT succeeds, the scheduled LAA UL subframe may be transmitted with a modified PUSCH format by puncturing the first symbol (symbol 0).

Thus, with option 4, the scheduled subframe structure does not need to be modified if the LBT in the last symbol (symbol 13) of the previous subframe is successful, the scheduled UL LAA subframe structure needs to be modified by puncturing the first symbol (symbol 0) if the LBT in the last symbol (symbol 13) of the previous subframe fails and a second LBT is performed in the first symbol (symbol 0) of the scheduled subframe. Compared with Option 1 and Option 2 above, Option 4 provides more channel access opportunities and a longer CCA gap for channel access. Compared with Option 3, Option 4 provides more channel access opportunities and reduces the chance of a modified PUSCH format.

If the LBT method is indicated in the UL grant for the given UL LAA subframe, the given LBT method may be used. The LBT category 4 parameters may be based on a CCA gap of one symbol spaces. If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 µs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters should be based on a CCA gap of one symbol space.

In a third format (Format 3), an LAA PUSCH may start at DFT-S-OFDM symbol 1 and transmit up to DFT-S-OFDM symbol 13. In Format 3, the first symbol (symbol 0) in the LAA subframe is blank.

In a fourth format (Format 4), an LAA PUSCH may start at DFT-S-OFDM symbol 1 and transmit up to DFT-S-OFDM symbol 12. In Format 4, the first and the last symbol (symbol 13) are blank in the LAA subframe.

Both format 3 and format 4 have a blank symbol at the beginning of the subframe. These two formats may be used for a single UL LAA subframe, or the initial UL LAA subframe in a burst of UL LAA subframes, or a continuous LAA UL subframe within a LAA UL burst especially when some simultaneous transmissions from other LAA UEs 102 are scheduled.

For the LBT with LAA PUSCH format 3 and Format 4, several options are described. In a first option (Option 1), LBT is only performed in the first symbol (symbol 0) of the scheduled UL LAA subframe. Since a CCA gap is included in the first symbol (symbol 0) of the scheduled UL subframe, the LBT can be limited to the space of the first symbol (symbol 0) in all cases.

If the LBT method is indicated in the UL grant for the given UL LAA subframe, the given LBT method should be used. The LBT category 4 parameters may be based on a CCA gap of one symbol spaces.

If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 µs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters may be based on a CCA gap of one symbol space.

Furthermore, if the eNB 160 schedules multiple LAA UL transmissions from multiple UEs 102, the same LBT method and the LBT parameters (e.g., contention window size, backoff counter values, etc.) may be signaled to all participating UEs 102.

In a second option (Option 2), the contention access region and LBT may be determined by the last symbol (symbol 13) of the previous subframe as well. In option 2, the contention access region and LBT should consider the last symbol (symbol 13) of the previous subframe as well. The blanked last symbol (symbol 13) of the previous subframe and blanked first symbol (symbol 0) of a scheduled subframe provide a longer contention access region or CCA gap. Thus, the LBT parameters may be better adjusted to the channel occupancy and congestion conditions.

If the last symbol (symbol 13) of the previous subframe is not blanked for channel access, the contention access and LBT method can be the same as in Option 1 above. On the other hand, if the last symbol (symbol 13) of the previous subframe is also blanked for channel access, a two-symbol CCA gap can be used for contention access. The UE 102 may use the indicated LAA PUSCH format even if LBT is successful in the last symbol (symbol 13) of the previous subframe. Thus, the UE 102 may always follow the indicated LAA PUSCH format in all cases.

If the LBT method is indicated in the UL grant for the given UL LAA subframe, the given LBT method may be used. The LBT category 4 parameters may be based on a CCA gap of two symbol spaces. If the LBT method is not indicated in the UL grant for the given UL LAA subframe, the LBT method may be determined based on whether it is within the MCOT of an eNB 160 transmission. If the scheduled UL LAA subframe is within the MCOT of an eNB 160 transmission, a single CCA sensing of at least 25 µs may be applied before the UL LAA subframe transmission. If the scheduled UL LAA subframe is outside of the MCOT of an eNB 160 transmission, a category 4 LBT may be applied before the UL LAA subframe transmission. The LBT category 4 parameters should be based on a CCA gap of two symbol space.

Furthermore, if the eNB 160 schedules multiple LAA UL transmissions from multiple UEs 102, the same LBT method and LBT parameters (e.g., contention window size, backoff counter values, etc.) may be signaled to all participating UEs 102.

Signaling requirements for PUSCH format and LBT methods are also described herein. Based on the discussion above, to determine the appropriate LBT method and parameters for all LAA PUSCH formats, the UE 102 needs to know whether the last symbol (symbol 13) of previous subframe is empty or not. Thus, 2 bits may indicate the format of a scheduled UL LAA PUSCH subframe (i.e., whether the first symbol (symbol 0) and/or last symbol (symbol 13) is blanked for channel access).

Also, one extra bit may be needed to indicate whether the last symbol (symbol 13) of the previous subframe is blanked as a CCA gap or not. In the case of multiple LAA subframe scheduling, if all UL LAA subframes are scheduled in a single DCI, the UE 102 may know the structure of the previous subframe, thus no extra bit is needed to indicate the availability of the last symbol of the previous subframe.

The LAA PUSCH format and the length of the CCA gap may impact the LBT method and parameters for the given subframe. In one approach, the LBT method and parameters are signaled for every UL LAA subframe. In a continuous UL LAA subframe in a burst where there is no CCA gap reserved before the scheduled subframe, the UE 102 may transmit the UL LAA subframe without LBT if the previous LAA UL subframe is transmitted (i.e., ignore the indicated LBT and parameters). The indicated LBT and parameters may be applied if the previous LAA UL subframe is not transmitted due to LBT failure.

If the eNB 160 schedules multiple LAA UL transmissions from multiple UEs 102, the same LBT method and the LBT parameters (e.g., contention window size, backoff counter values, etc.) may be signaled to all participating UEs 102.

In another approach, the LBT method may not be signaled. The UE 102 may determine the LBT methods and LBT parameters based on the location of the scheduled LAA UL subframe and the indicated PUSCH format and the length of the CCA gap. For example, for a category 4 LBT, the contention window size may be determined dynamically based on the length of the CCA gap. If the eNB 160 schedules multiple LAA UL transmissions from multiple UEs 102, the participating UEs 102 should have the same understanding on the LBT method and the LBT parameters in the given UL LAA subframe.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a UL LAA PUSCH format signaling and contention access module 194.

The UL LAA PUSCH format signaling and contention access module 194 may perform UL LAA PUSCH format signaling and contention access operations. This may be accomplished as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
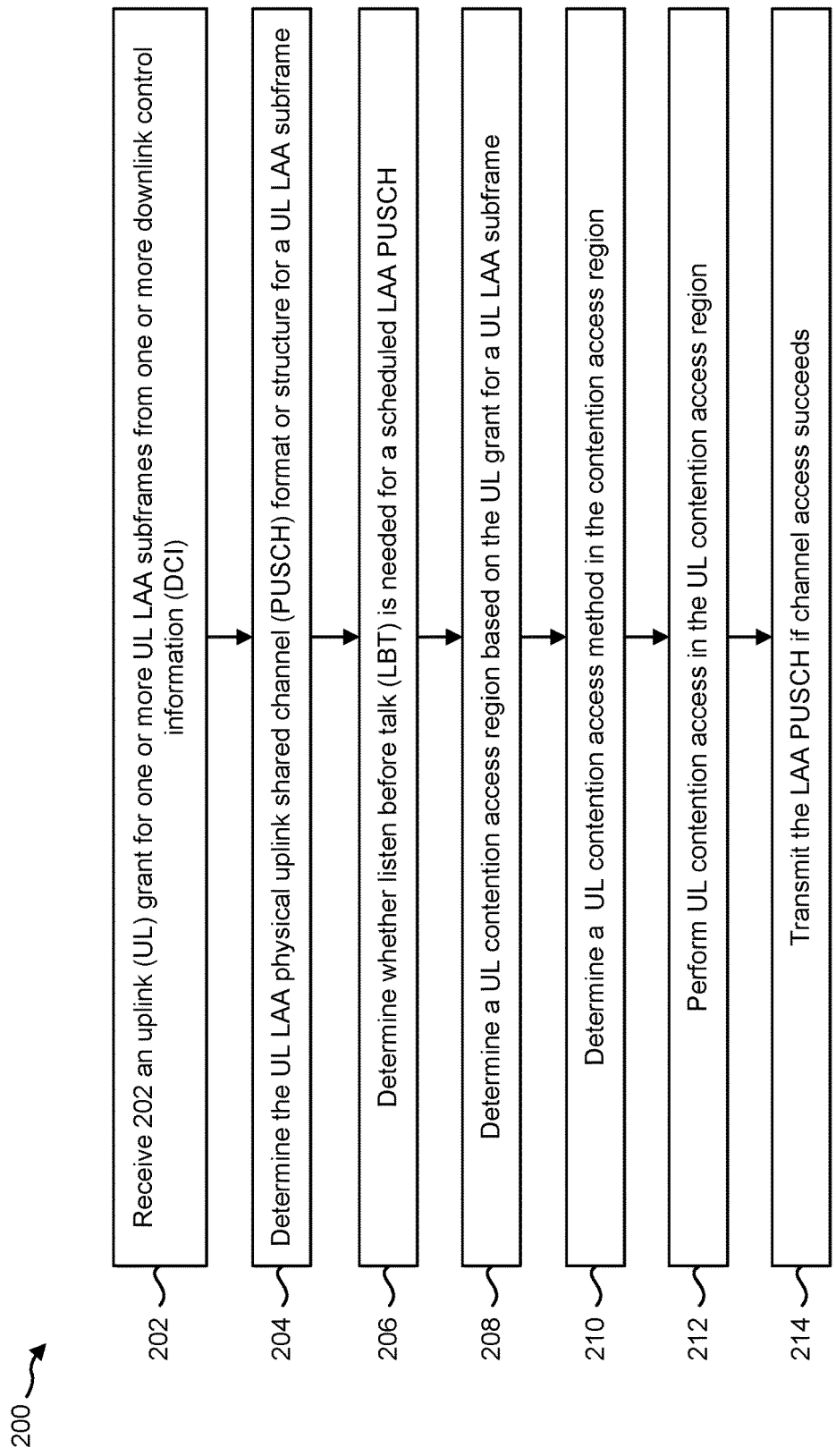
FIG. 2 is a flow diagram illustrating a method for PUSCH format signaling and contention access by a UE.

FIG. 2 is a flow diagram illustrating a method 200 for PUSCH format signaling and contention access by a UE 102. The UE 102 may communicate with one or more eNBs 160 in a wireless communication network. In one implementation, the wireless communication network may include an LTE network.

The UE 102 may receive 202 an uplink (UL) grant for one or more UL LAA subframes from one or more downlink control information (DCI). A UL grant may be a DCI format in a PDCCH or EPDCCH, or PHICH feedback.

The UE 102 may determine 204 the UL LAA physical uplink shared channel (PUSCH) format or structure for a UL LAA subframe. The UL grant DCI may indicate the LAA PUSCH format of the scheduled subframe and information about the availability of the last symbol of the previous subframe. The UL LAA PUSCH format or structure for a UL LAA subframe may start from symbol 0 or 1 and may end at symbol 12 or symbol 13. In an implementation, the UL LAA PUSCH may start at symbol 0 and the last symbol of the previous subframe is not blank.

The UE 102 may determine 206 whether listen before talk (LBT) is needed for a scheduled LAA PUSCH. When the previous LAA subframe transmission is successful, the UE 102 may transmit the scheduled LAA PUSCH without LBT.

If needed, the UE 102 may determine 208 a UL contention access region based on the UL grant for a UL LAA subframe. The contention access region may be determined based on the indicated LAA PUSCH structure. The contention access region may be determined based on the indicated LAA PUSCH structure and whether the last symbol of the previous subframe is blank. The UE 102 may determine 210 a UL contention access method in the contention access region.

The UE 102 may also perform 212 UL contention access in the UL contention access region. For example, the UE 102 may perform LBT in the UL contention access region. The UE 102 may transmit 214 the LAA PUSCH if channel access succeeds.

Figure 3:
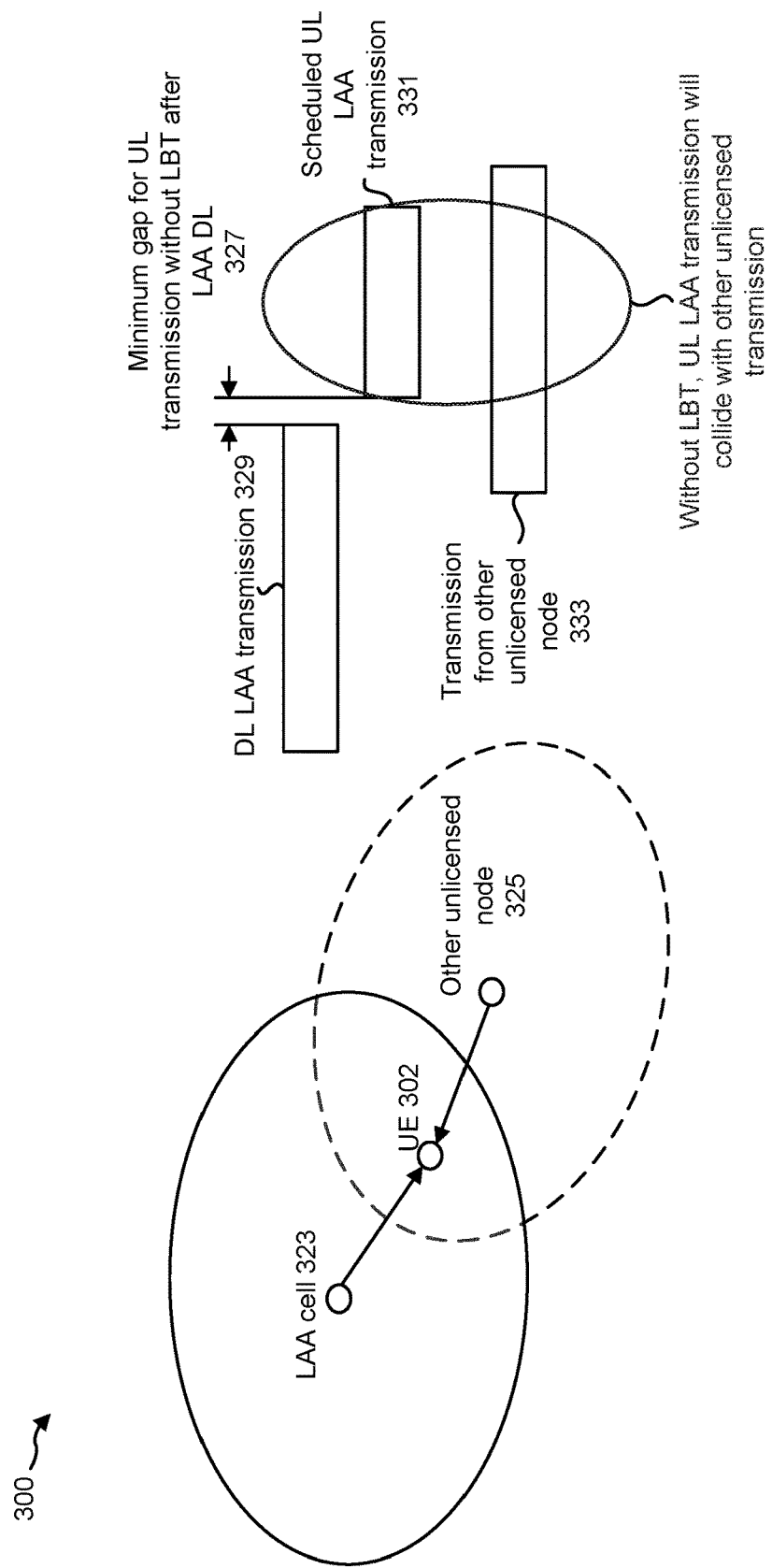
FIG. 3 illustrates the hidden node problem for uplink (UL) transmission without listen before talk (LBT)

FIG. 3 illustrates the hidden node problem for UL transmission without LBT. In FIG. 3, a UE 302 may be in range of an LAA cell 323 (e.g., an eNB 160) and another unlicensed node 325. The other unlicensed node 325 is out of range of the LAA cell. Therefore, it may be considered a hidden node (also referred to as a hidden terminal).

An LAA DL transmission cannot avoid the hidden node issue observed at a UE 302 because the channel observed at the eNB 160 and the UE 302 may be different. The LAA cell 323 may send a DL LAA transmission 329 followed by the minimum gap 327 for a UL transmission without LBT.

The UE 302 may have a scheduled UL LAA transmission 331. However, there may be other unlicensed transmissions 333 near the UE 302 that are not detected by the LAA eNB 160. If the UE 302 transmits without sensing, it will cause collision to an ongoing unlicensed transmission 333.

FIG. 4 is a diagram illustrating a category 2 UL LAA transmission. The category 2 LBT may be performed before a scheduled UL transmission. Category 2 LBT only requires a single CCA sensing before transmission. This may occur in a CCA sensing interval 437 that precedes the UL subframe boundary 439. This is also called frame based equipment (FBE) contention access.

As shown in FIG. 4, a scheduled LAA UE 102 performs CCA detection in a single CCA sensing interval 437 upon the scheduled UL subframe boundary 439. If the channel is idle, the LAA UE 102 can transmit the LAA UL subframe 441 as scheduled. Otherwise, the UL transmission is dropped.

FIG. 5 illustrates an example a single clear channel assessment (CCA) sensing of at least 25 μs at the beginning of a CCA gap. As shown in FIG. 5, the propagation delay is represented as δ. The TA value will be 2δ and the CCA sensing interval 545 may be aligned with the DL symbol boundary 543 including the propagation delay.

If there is another unlicensed transmission within the CCA sensing interval 545, the LBT fails, and the LAA UE 102 should defer the contention access in the next available CCA gap. If the CCA sensing is successful, a UL LAA UE 102 may start transmission. But a reservation signal 549 or initial signal may be transmitted before the scheduled UL LAA subframe 551 (e.g., PUSCH) to occupy the channel.

FIG. 6 is a diagram illustrating implementations of an LAA PUSCH with required LBT channel access and no blank symbol. In one implementation, the scheduled UL LAA subframe may be a single UL LAA subframe 651a (or the initial UL LAA subframe in a burst of UL LAA subframes). In this implementation, the last symbol 653a of the previous subframe may be used as a CCA gap for contention access.

In another implementation, the scheduled UL LAA subframe may be a subframe 651c in the middle of a UL LAA burst. In this implementation, the previous subframe 651b may be indicated with the last symbol 653b (symbol 13) blanked.

These implementations may be useful for simultaneous UL LAA transmissions from multiple LAA UEs 102.

FIG. 7 is a diagram illustrating determining whether LBT is needed by the status of a previous UL LAA subframe transmission. If the scheduled UL LAA subframe 751 is a continuous transmission within a LAA UL burst and the previous UL LAA subframe 751 does not have the last symbol (symbol 13) blanked, whether a LBT is required or not depends on whether the previous LAA transmission is successful or not. Since the subframe 751 is in the middle of a continuous LAA burst transmission, the LBT method may or may not be indicated.

If the LBT method is indicated, as a continuous LAA transmission, LBT may not be needed for a scheduled UL LAA subframe 751b if the previous UL LAA subframe 751a is transmitted. If no LBT method is indicated, LBT may still be performed for a scheduled UL LAA subframe 751d if the previous LAA subframe 751c is not transmitted due to a failed LBT in an earlier time.

FIG. 8 is a diagram illustrating options for a CCA gap and LBT in the case of a failed transmission in a previous subframe 851. Regardless of the LBT method, there are several different options to determine the CCA gap for contention access. In these examples, the last symbol 853 of the previous UL LAA subframe 851a, 851c, 851e, 851g is not blanked.

In a first option (Option 1), LBT for a scheduled UL LAA subframe 851b is performed in the last symbol 853a space of the previous subframe 851a.

In a second option (Option 2), LBT for a scheduled UL LAA subframe 851d is performed in the first symbol 853b space of the scheduled UL LAA subframe 851d.

In a third option (Option 3), a single LBT for the scheduled UL LAA subframe 851f is performed in the last symbol 853c space of the previous subframe 851e and the first symbol 853d space of the scheduled UL LAA subframe 851f.

In a fourth option (Option 4), a two-step LBT for the scheduled UL LAA subframe 851h is performed in the last symbol 853e space of the previous subframe 851g and the first symbol 853f space of the scheduled subframe UL LAA subframe 851h.

Figure 9:
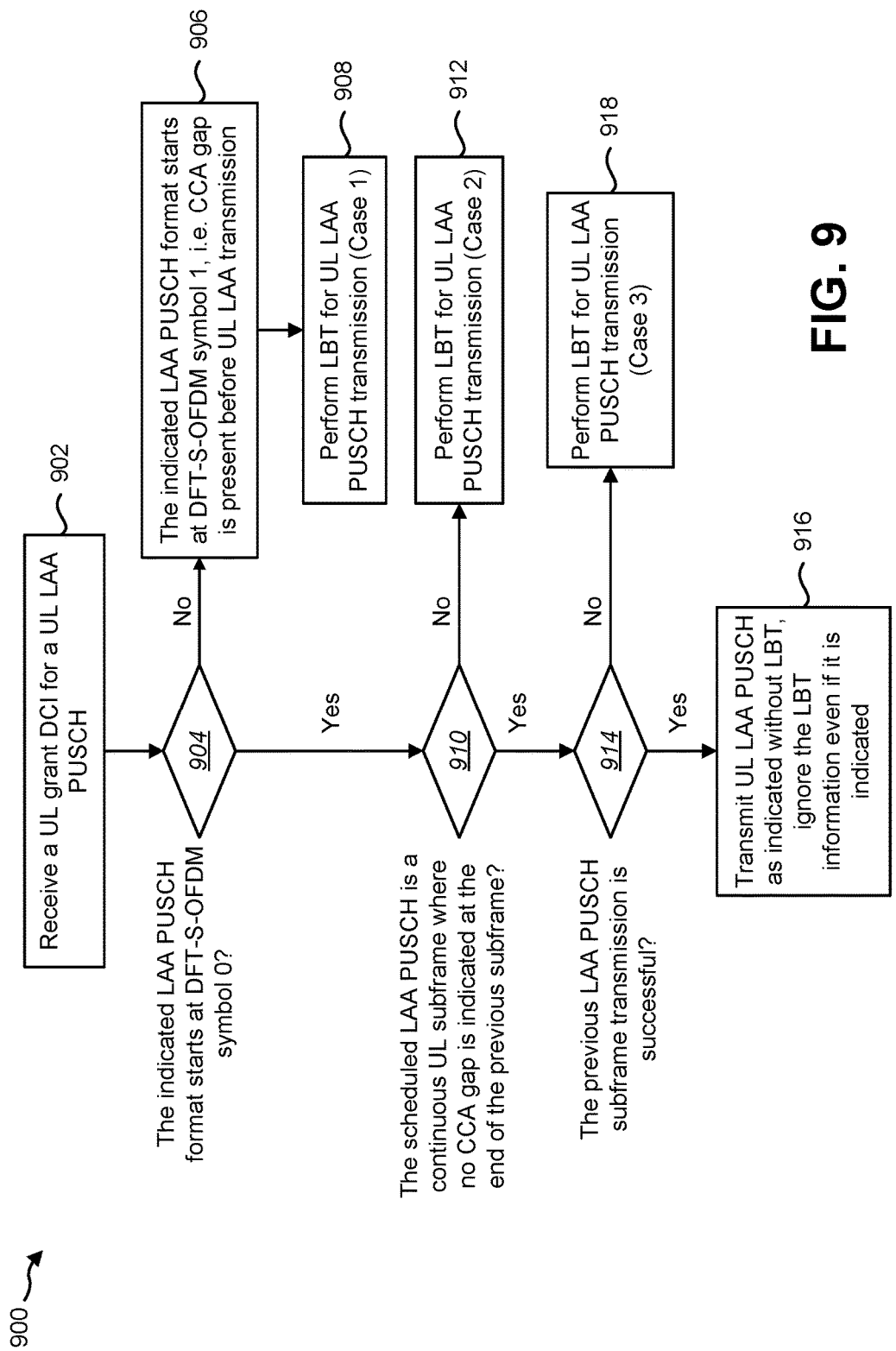
FIG. 9 is a flow diagram illustrating a method for LAA PUSCH format signaling and performing contention access.

FIG. 9 is a flow diagram illustrating a method 900 for LAA PUSCH format signaling and performing contention access. Specifically, the method 900 illustrates PUSCH formats and whether LBT should be performed before transmission. The method 900 may be implemented by a UE 102. The UE 102 may communicate with one or more eNBs 160 in a wireless communication network. In one implementation, the wireless communication network may include an LTE network.

The UE 102 may receive 902 a UL grant DCI for a UL LAA PUSCH. The UL grant DCI for the LAA PUSCH transmission may indicate the PUSCH format.

Figure 10:
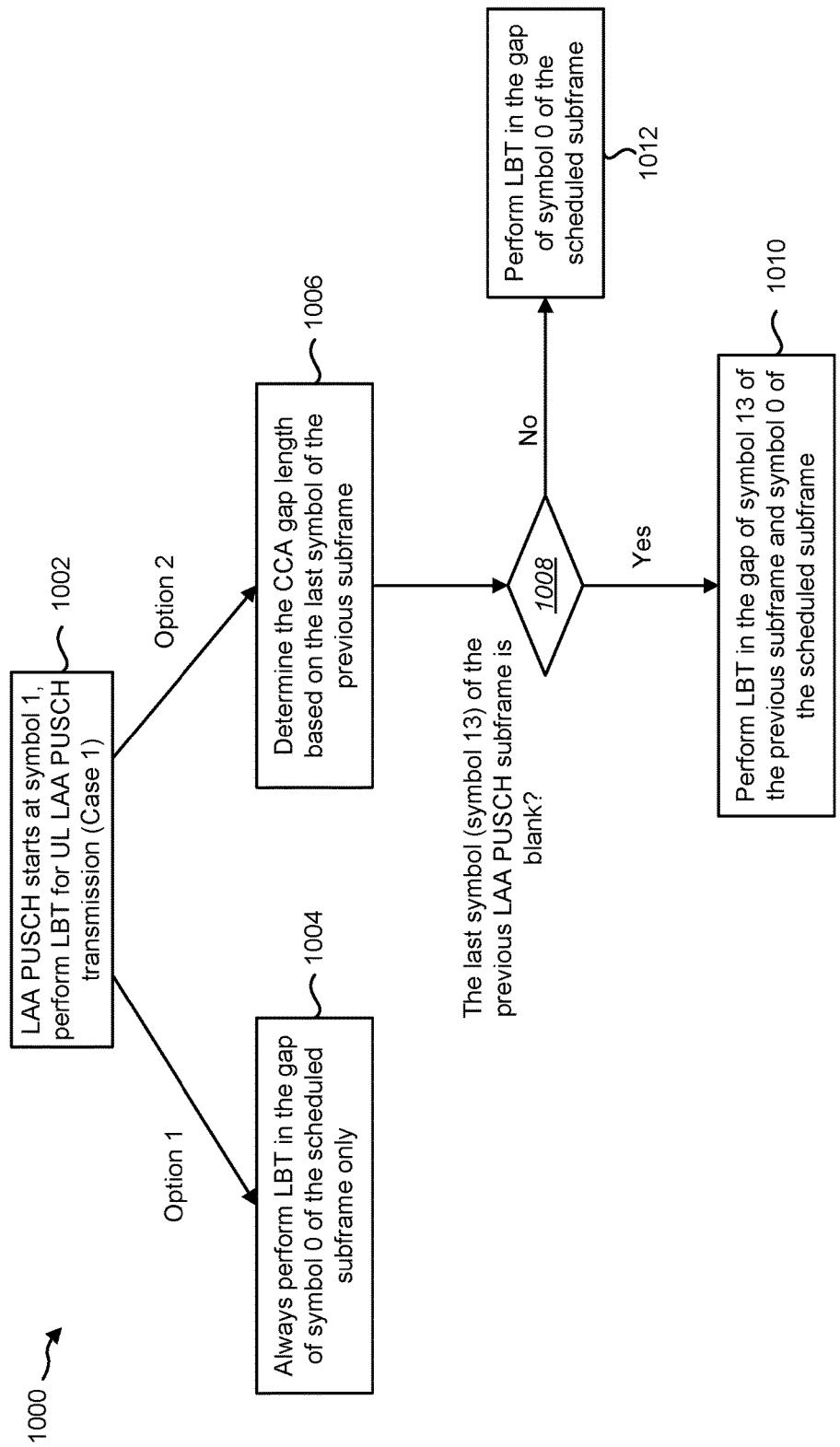
FIG. 10 is a flow diagram illustrating a method for performing a case 1 LBT.

The UE 102 may determine 904 whether the indicated LAA PUSCH format starts at DFT-S-OFDM symbol 0. The UE 102 should determine 904 whether the PUSCH starts at DFT-S-OFDM symbol 0 or symbol 1. If the PUSCH starts 906 at DFT-S-OFDM symbol 1, then a CCA gap is always present and the LBT should be performed 908 before the LAA PUSCH transmission (i.e., Case 1 LBT). FIG. 10 shows options of a Case 1 LBT method.

If the PUSCH starts at DFT-S-OFDM symbol 0, then the UE 102 may determine 910 whether a CCA gap is available before the subframe. In other words, the UE 102 may determine 910 whether the scheduled LAA PUSCH is a continuous UL subframe where no CCA gap is indicated at the end of the previous subframe. A CCA gap is available if the scheduled LAA PUSCH is a single UL subframe, an initial UL subframe in a multiple subframe scheduling, or a continuous UL subframe where the last symbol (symbol 13) of the previous subframe is signaled as blank.

If the scheduled LAA PUSCH is not a continuous UL subframe where no CCA gap is indicated at the end of the previous subframe, then the UE 102 may perform 912 LBT for the UL LAA PUSCH transmission (i.e., Case 2). For Case 2, the LBT is always performed assuming the last symbol (symbol 13) of the previous subframe is blank and used for channel access.

If the scheduled UL LAA PUSCH is a continuous UL subframe where no CCA gap is indicated at the end of the previous subframe, the presence of a CCA gap depends on whether the previous UL PUSCH is transmitted successfully or not.

The UE 102 may determine 914 whether the previous LAA PUSCH subframe transmission is successful. If the previous LAA PUSCH is transmitted successfully from the given UE 102, the UE 102 may transmit 916 the given UL LAA PUSCH as indicated without LBT. The UE 102 may ignore the LBT method and/or parameters even if indicated.

Figure 11:
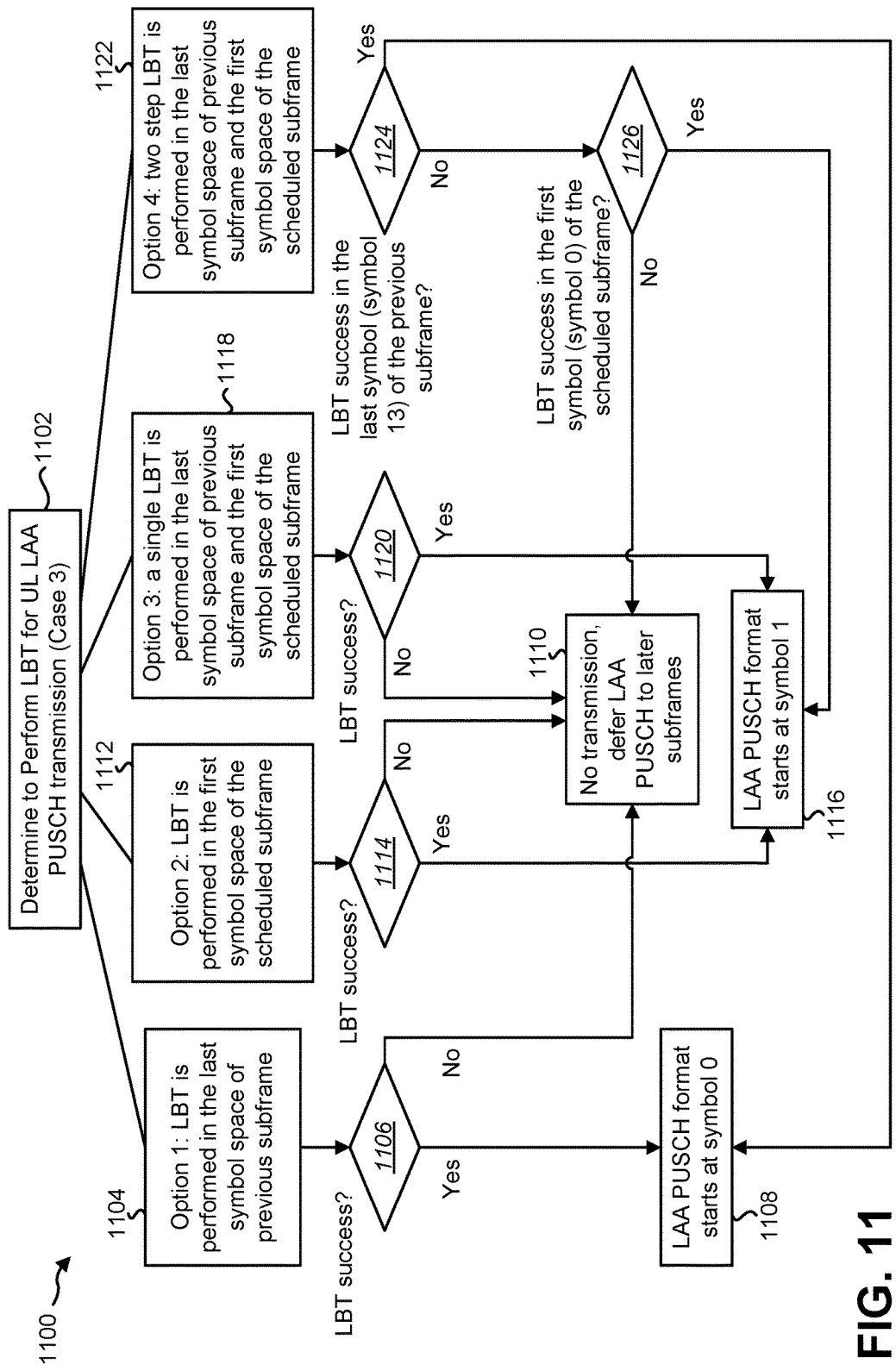
FIG. 11 is a flow diagram illustrating a method for performing a case 3 LBT.

If the previous LAA PUSCH is not transmitted successfully (e.g., failed LBT), then the UE 102 may perform 918 LBT for the scheduled LAA PUSCH transmission (i.e., Case 3). Multiple options can be used for Case 3 LBT, as shown in FIG. 11 (also illustrated in FIG. 8).

FIG. 10 is a flow diagram illustrating a method 1000 for performing a case 1 LBT. The method 1000 may be implemented by a UE 102.

The UE 102 may determine 1002 that an LAA PUSCH starts at symbol 1. In this case (i.e., case 1), the UE 102 may perform LBT for the UL LAA PUSCH transmission. The UE 102 may implement one of two options for a case 1 LBT. In one option, the UE 102 may always perform 1004 LBT in the gap of symbol 0 of the scheduled subframe only.

In another option, the UE 102 may determine 1006 the length of the CCA gap for LBT based on the PUSCH format of the previous subframe. If UE 102 determines 1008 that the last symbol (symbol 13) of the previous LAA PUSCH subframe is blank, the UE 102 may perform 1010 LBT in the gap of symbol 13 of the previous subframe and symbol 0 of the scheduled subframe. Otherwise, the UE 102 may perform 1012 LBT in the gap of symbol 0 of the scheduled subframe only.

FIG. 11 is a flow diagram illustrating a method 1100 for performing a case 3 LBT. The method 1100 may be implemented by a UE 102.

The UE 102 may determine 1102 to perform LBT for a UL LAA PUSCH transmission. In this example, the LBT is a case 3 LBT. If the previous LAA PUSCH is not transmitted successfully (e.g., failed LBT), the UE 102 may perform LBT for the scheduled LAA PUSCH transmission. Multiple options can be used for case 3 LBT.

In Option 1, the UE 102 may perform 1104 LBT in the last symbol space of the previous subframe. If the UE 102 determines 1106 that the LBT is successful, the LAA PUSCH format should start 1108 at symbol 0 as signaled in the UL grant DCI. Otherwise, there is no transmission 1110 and the LAA PUSCH is deferred to later subframes.

In Option 2, the UE 102 may perform 1112 LBT in the first symbol space of the scheduled subframe. If the UE 102 determines 1114 that the LBT is successful, the LAA PUSCH format should start 1116 at symbol 1 by puncturing the symbol 0 of the PUSCH format indicated in the UL grant DCI. there is no transmission 1110 and the LAA PUSCH is deferred to later subframes.

In Option 3, the UE 102 may perform 1118 a single LBT in the last symbol space of previous subframe and the first symbol space of the scheduled subframe. If the UE 102 determines 1120 that the LBT is successful, the LAA PUSCH format should start 1116 at symbol 1 by puncturing the symbol 0 of the PUSCH format indicated in the UL grant DCI. there is no transmission 1110 and the LAA PUSCH is deferred to later subframes.

In Option 4, the UE 102 may perform 1122 a two-step LBT in the last symbol space of previous subframe and the first symbol space of the scheduled subframe. If the UE 102 determines 1124 that the LBT is successful in the last symbol (symbol 13) of the previous subframe, the LAA PUSCH format should start 1108 at symbol 0 as signaled in the UL grant DCI.

If LBT fails in the last symbol (symbol 13) of the previous subframe, a second LBT may be performed in the first symbol (symbol 0) of the scheduled subframe. If the UE 102 determines 1126 that the LBT is successful in the first symbol (symbol 0) of the scheduled subframe, the LAA PUSCH format should start 1116 at symbol 1 by puncturing the symbol 0 of the PUSCH format indicated in the UL grant DCI, there is no transmission 1110 and the LAA PUSCH is deferred to later subframes.

Figure 12:
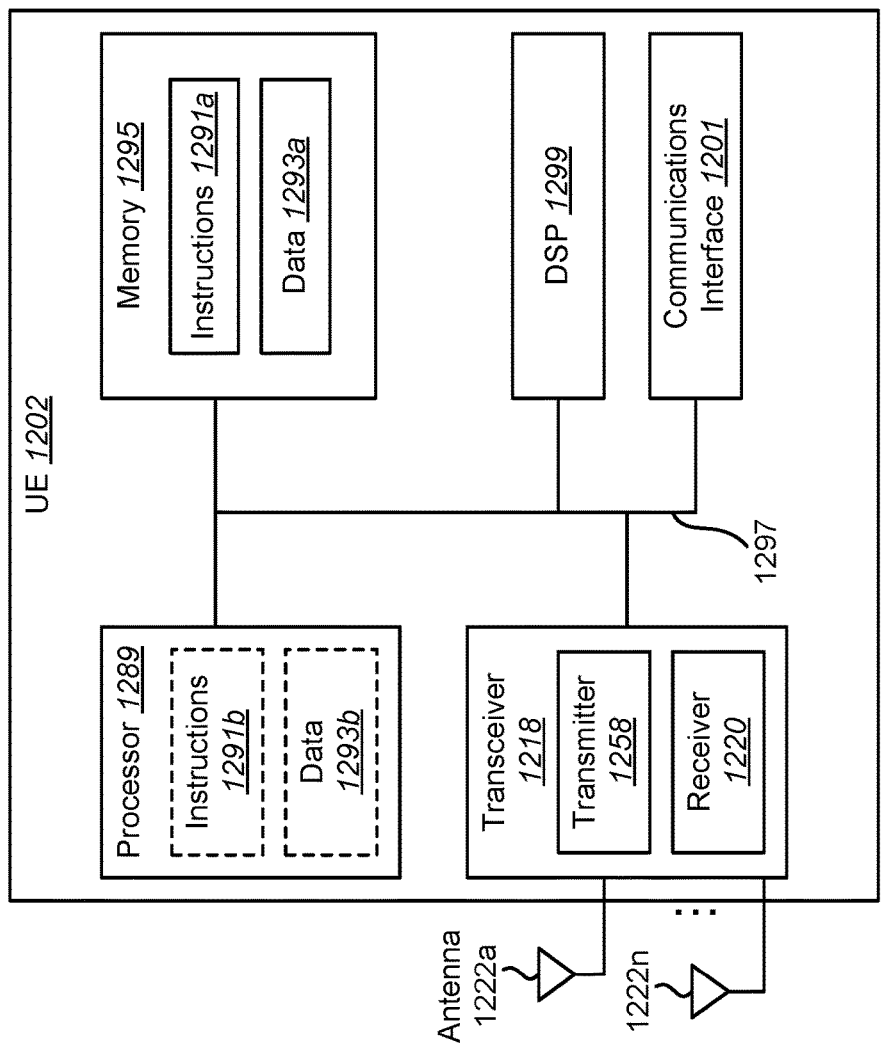
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1289 that controls operation of the UE 1202. The processor 1289 may also be referred to as a central processing unit (CPU). Memory 1295, which may include read-only memory (ROM), random access memory (RAM), a combination of the two or any type of device that may store information, provides instructions 1291a and data 1293a to the processor 1289. A portion of the memory 1295 may also include non-volatile random access memory (NVRAM). Instructions 1291b and data 1293b may also reside in the processor 1289. Instructions 1291b and/or data 1293b loaded into the processor 1289 may also include instructions 1291a and/or data 1293a from memory 1295 that were loaded for execution or processing by the processor 1289. The instructions 1291b may be executed by the processor 1289 to implement the method 200 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1297, which may include a power bus, a control signal bus and a status signal bus, in addition to a data bus. However, for the sake of clarity, the various buses are illustrated in FIG. 12 as the bus system 1297. The UE 1202 may also include a digital signal processor (DSP) 1299 for use in processing signals. The UE 1202 may also include a communications interface 1201 that provides user access to the functions of the UE 1202. The UE 1202 illustrated in FIG. 12 is a functional block diagram rather than a listing of specific components.

Figure 13:
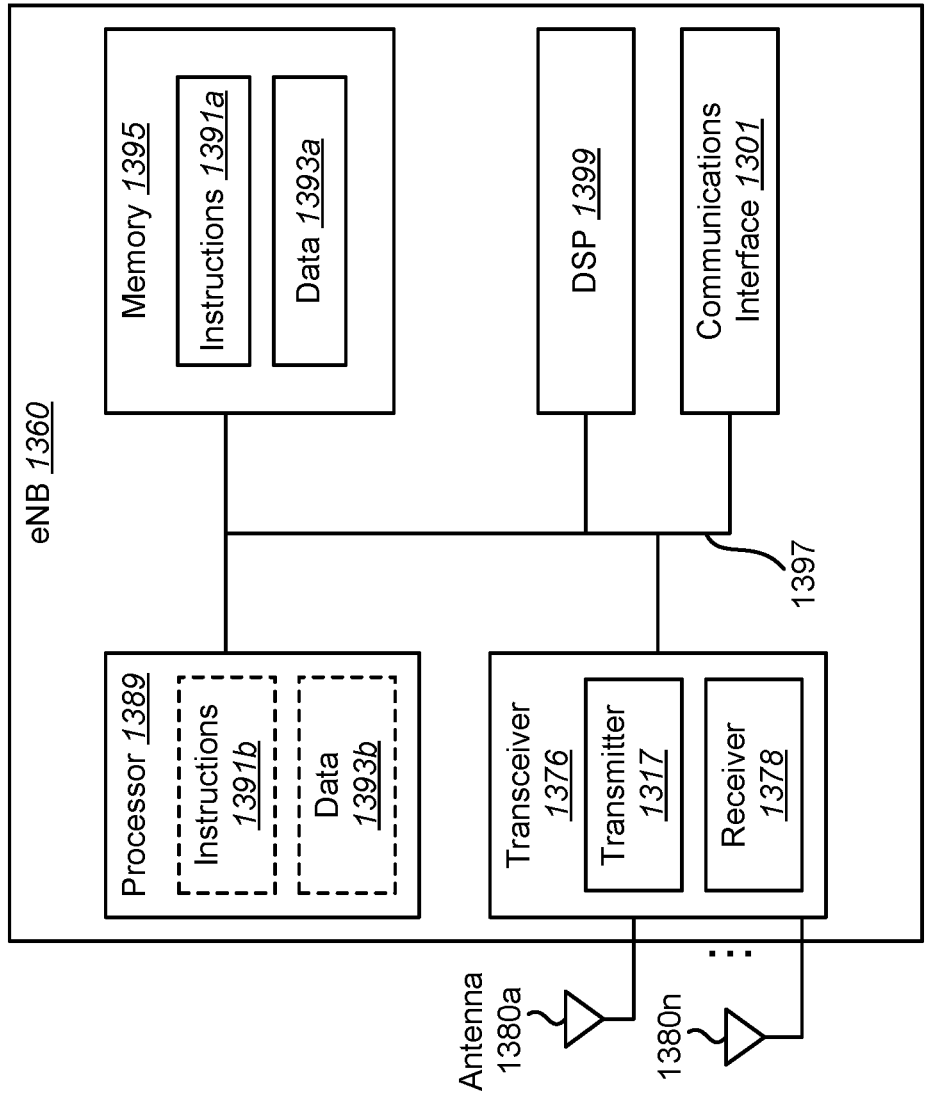
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1389 that controls operation of the eNB 1360. The processor 1389 may also be referred to as a central processing unit (CPU). Memory 1395, which may include read-only memory (ROM), random access memory (RAM), a combination of the two or any type of device that may store information, provides instructions 1391a and data 1393a to the processor 1389. A portion of the memory 1395 may also include non-volatile random access memory (NVRAM). Instructions 1391b and data 1393b may also reside in the processor 1389. Instructions 1391b and/or data 1393b loaded into the processor 1389 may also include instructions 1391a and/or data 1393a from memory 1395 that were loaded for execution or processing by the processor 1389. The instructions 1391b may be executed by the processor 1389 to implement one or more methods described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the eNB 1360 are coupled together by a bus system 1397, which may include a power bus, a control signal bus and a status signal bus, in addition to a data bus. However, for the sake of clarity, the various buses are illustrated in FIG. 13 as the bus system 1397. The eNB 1360 may also include a digital signal processor (DSP) 1399 for use in processing signals. The eNB 1360 may also include a communications interface 1301 that provides user access to the functions of the eNB 1360. The eNB 1360 illustrated in FIG. 13 is a functional block diagram rather than a listing of specific components.

Figure 14:
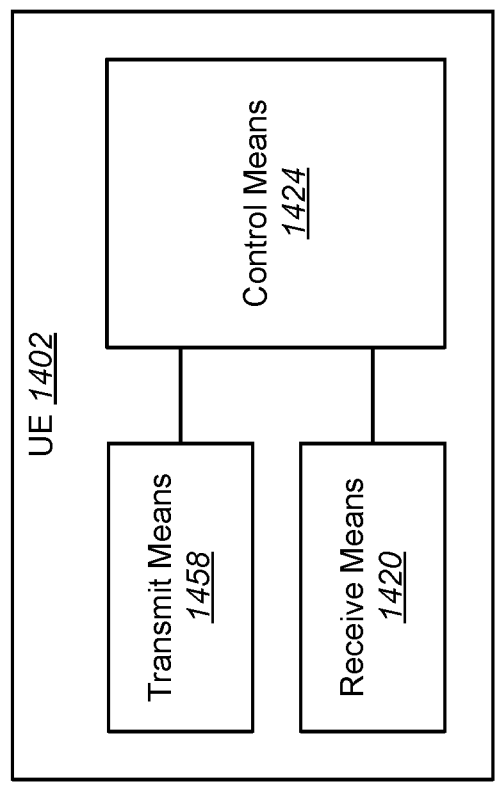
FIG. 14 is a block diagram illustrating one implementation of a UE in which systems and methods for PUSCH format signaling and contention access may be implemented.

FIG. 14 is a block diagram illustrating one implementation of a UE 1402 in which systems and methods for PUSCH format signaling and contention access may be implemented. The UE 1402 includes transmit means 1458, receive means 1420 and control means 1424. The transmit means 1458, receive means 1420 and control means 1424 may be configured to perform one or more of the functions described in connection with FIG. 1 above. FIG. 12 above illustrates one example of a concrete apparatus structure of FIG. 14. Other various structures may be implemented to realize one or more of the functions of FIG. 1. For example, a DSP may be realized by software.

Figure 15:
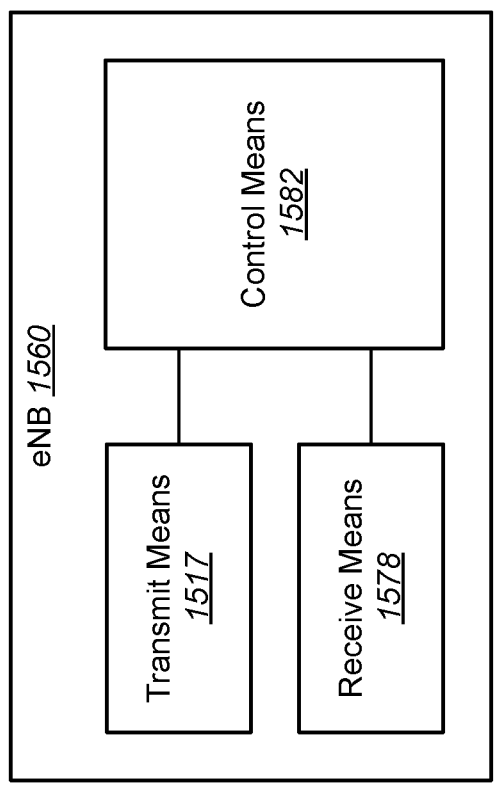
FIG. 15 is a block diagram illustrating one implementation of an eNB in which systems and methods for PUSCH format signaling and contention access may be implemented.

FIG. 15 is a block diagram illustrating one implementation of an eNB 1560 in which systems and methods for PUSCH format signaling and contention access may be implemented. The eNB 1560 includes transmit means 1517, receive means 1578 and control means 1582. The transmit means 1517, receive means 1578 and control means 1582 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
a receiver configured to receive a PDCCH with a downlink control information (DCI) format, the PDCCH scheduling a single physical uplink shared channel (PUSCH), the single PUSCH being a first PUSCH in subframe n, the DCI indicating a starting position and an ending position of the PUSCH;
contention access circuitry configured to perform a channel access procedure; and
a transmitter configured to transmit the first PUSCH; wherein
when any PUSCH is not transmitted in subframe n−1, the channel access procedure is performed immediately before a transmission of the first PUSCH, and
when a second PUSCH is transmitted in subframe n−1:
if the starting position of the first PUSCH is later than an initial subframe boundary of the subframe n or if the ending position of the second PUSCH is earlier than a final subframe boundary of the subframe n−1, the channel access procedure is performed immediately before the transmission of the first PUSCH; and
if there is no gap between the first PUSCH and the second PUSCH, the transmission of the first PUSCH is performed without performing the channel access procedure immediately before the transmission of the first PUSCH.

2. A method of a user equipment (UE) comprising:
receiving a physical downlink control channel (PDCCH) with a downlink control information (DCI) format, the PDCCH scheduling a single physical uplink shared channel (PUSCH), the single PUSCH being a first PUSCH in subframe n, the DCI indicating a starting position and an ending position of the PUSCH;
performing a channel access procedure; and
transmitting the first PUSCH; wherein
when any PUSCH is not transmitted in subframe n−1, the channel access procedure is performed immediately before a transmission of the first PUSCH, and
when a second PUSCH is transmitted in subframe n−1:
if the starting position of the first PUSCH is later than an initial subframe boundary of the subframe n or if the ending position of the second PUSCH is earlier than a final subframe boundary of the subframe n−1, the channel access procedure is performed immediately before the transmission of the first PUSCH; and
if there is no gap between the first PUSCH and the second PUSCH, the transmission of the first PUSCH is performed without performing the channel access procedure immediately before the transmission of the first PUSCH.

* * * * *